US011574652B2

(12) United States Patent
Ohkoshi et al.

(10) Patent No.: US 11,574,652 B2
(45) Date of Patent: Feb. 7, 2023

(54) RECORDING DEVICE AND RECORDING METHOD

(71) Applicants: The University of Tokyo, Tokyo (JP); OSAKA UNIVERSITY, Osaka (JP); FUJIFILM Corporation, Tokyo (JP)

(72) Inventors: Shin-ichi Ohkoshi, Tokyo (JP); Marie Yoshikiyo, Tokyo (JP); Kenta Imoto, Tokyo (JP); Kosuke Nakagawa, Tokyo (JP); Asuka Namai, Tokyo (JP); Hiroko Tokoro, Tokyo (JP); Makoto Nakajima, Osaka (JP); Masashi Shirata, Kanagawa (JP); Kenji Naoi, Kanagawa (JP)

(73) Assignees: THE UNIVERSITY OF TOKYO, Tokyo (JP); OSAKA UNIVERSITY, Osaka (JP); FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/401,326

(22) Filed: Aug. 13, 2021

(65) Prior Publication Data
US 2021/0375314 A1 Dec. 2, 2021

Related U.S. Application Data

(63) Continuation of application No. PCT/JP2020/005355, filed on Feb. 12, 2020.

(30) Foreign Application Priority Data

Feb. 13, 2019 (JP) .............................. JP2019-024026

(51) Int. Cl.
*G11B 5/00* (2006.01)
*G11B 11/105* (2006.01)
*G11B 5/706* (2006.01)

(52) U.S. Cl.
CPC .... *G11B 11/10536* (2013.01); *G11B 5/70642* (2013.01); *G11B 2005/0021* (2013.01)

(58) Field of Classification Search
CPC ................. G11B 11/10; G11B 11/105; G11B 2005/0021; G11B 5/3133; G11B 5/3136;
(Continued)

(56) References Cited

U.S. PATENT DOCUMENTS 8,335,052 B2 * 12/2012 Takayama .............. G11B 5/314
360/125.31
8,830,627 B2 9/2014 Sugiura et al.
(Continued)

FOREIGN PATENT DOCUMENTS

EP 3385951 10/2018
JP 2003203304 7/2003
(Continued)

OTHER PUBLICATIONS

Shin-Ichi Ohkoshi et al., "Nanometer-size hard magnetic ferrite exhibiting high optical-transparency and nonlinear optical-magnetoelectric effect," Scientific Reports, Oct. 2015, pp. 1-9.
(Continued)

*Primary Examiner* — Nabil Z Hindi
(74) *Attorney, Agent, or Firm* — JCIPRNET

(57) ABSTRACT

Provided is a recording device. The recording device includes: an external magnetic field application unit that is configured to apply an external magnetic field to a magnetic recording medium; a light irradiation unit that is configured to irradiate light; and a light focusing unit that is configured to focus the light from the light irradiation unit by resonating the light to generate an enhanced magnetic field in which a magnetic field of the light is enhanced, in which magnetization of the magnetic recording medium is inverted by
(Continued)

applying the external magnetic field and the enhanced magnetic field to the magnetic recording medium.

20 Claims, 23 Drawing Sheets

(58) Field of Classification Search
CPC .............. G11B 5/314; G11B 5/6088; G11B 2005/0024; G11B 11/10506; G11B 11/1051
USPC .......................... 360/59, 75, 125.31, 125.74
See application file for complete search history.

(56) References Cited

U.S. PATENT DOCUMENTS

| | | |
|---|---|---|
| 2008/0055343 A1 | 3/2008 | Cho et al. |
| 2017/0316799 A1 | 11/2017 | Shimizu et al. |

FOREIGN PATENT DOCUMENTS

| | | |
|---|---|---|
| JP | 2006190446 | 7/2006 |
| JP | 2007328841 | 12/2007 |
| JP | 2008059737 | 3/2008 |
| JP | 5124825 | 1/2013 |
| JP | 2013175250 | 9/2013 |
| JP | 2017199446 | 11/2017 |

OTHER PUBLICATIONS

Shunsuke Sakurai et al., "First Observation of Phase Transformation of All Four Fe2O3 Phases (γ→ε→β→α-Phase)," JACS Articles, Nov. 2009, pp. 18299-18303.

Asuka Namai et al., "Synthesis of an Electromagnetic Wave Absorber for High-Speed Wireless Communication," JACS Articles, Dec. 2008, pp. 1170-1173.

Asuka Namai et al., "Hard magnetic ferrite with a gigantic coercivity and high frequency millimetre wave rotation," Nature Communications, Sep. 2012, pp. 1-6.

"International Search Report (Form PCT/ISA/210) of PCT/JP2020/005355," dated Apr. 7, 2020, with English translation thereof, pp. 1-5.

"Written Opinion of the International Searching Authority (Form PCT/ISA/237)" of PCT/JP2020/005355, dated Apr. 7, 2020, with English translation thereof, pp. 1-11.

"Office Action of China Counterpart Application", dated Mar. 24, 2022, with English translation thereof, p. 1-p. 19.

"Search Report of Europe Counterpart Application", dated Sep. 22, 2022, p. 1-p. 7.

Office Action of Korea Counterpart Application, with English translation thereof, dated Sep. 29, 2022, pp. 1-13.

\* cited by examiner

SET EXTERNAL MAGNETIC FIELD TO $(H_o)$ = -3000 Oe (3 kOe)

| $H_{millimeter}$ | $H_c$/Oe |
|---|---|
| 300 | 4000 |
| 700 | 5000 |
| 1100 | 6000 |
| 1500 | 7000 |
| 2000 | 8000 |
| 2400 | 9000 |
| 2900 | 10000 |

0 deg 30 deg 45 deg 60 deg

ENLARGED PICTURE

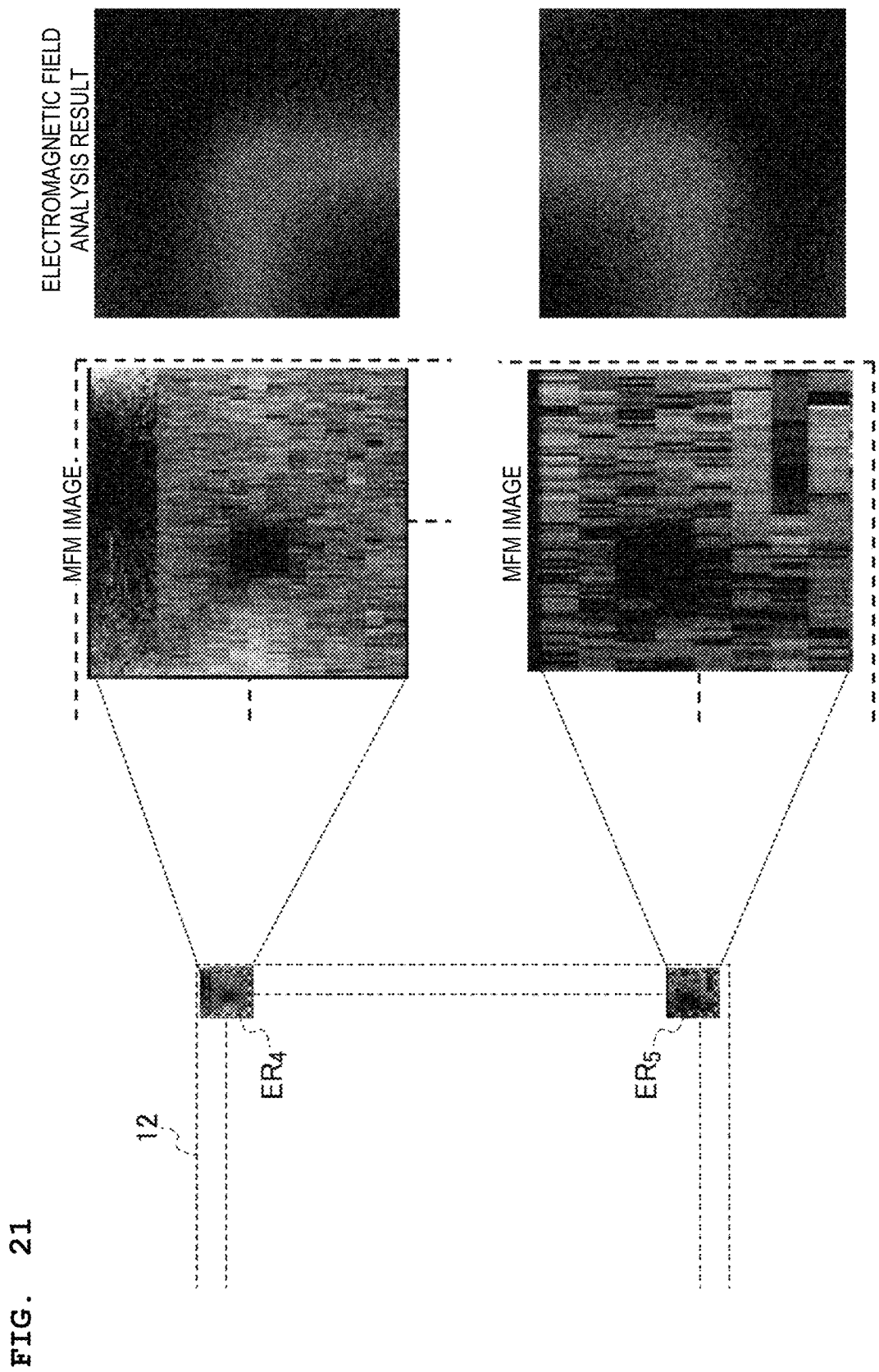

RECORDING DEVICE AND RECORDING METHOD

CROSS-REFERENCE TO RELATED APPLICATIONS

This application is a continuation application of International Application No. PCT/JP2020/005355 filed Feb. 12, 2020 the disclosure of which is incorporated herein by reference in its entirety. Further, this application claims priorities from Japanese Patent Application No. 2019-024026, filed Feb. 13, 2019, the disclosure of which is incorporated herein by reference in their entirety.

TECHNICAL FIELD

The present invention relates to a recording device and a recording method, and is preferably applied to a magnetic recording medium or the like using epsilon iron oxide particles.

BACKGROUND ART

In a magnetic recording medium, there has been a demand for the miniaturization of magnetic particles in order for the densification of recording, and recently, a magnetic recording medium using epsilon iron oxide particles in which the magnetic particles can be miniaturized has attracted attention. In accordance with the miniaturization of the magnetic particles, an S/N ratio of a signal can be increased, whereas it is considered that the stability of the magnetization with respect to heat is proportional to a magnetic anisotropic constant and a particle volume, and thus, thermal stability of the magnetization is impaired by the miniaturization.

Here, it is considered that the magnetic anisotropic constant can be increased by increasing a coercive force of the magnetic recording medium. Accordingly, in order to obtain particles having a small particle volume (particle diameter) and high thermal stability, it is effective to use a substance having a high coercive force as a magnetic material. For example, in PTL 1 and NPL 1 to 4, the inventors have disclosed epsilon iron oxide particles in which a coercive force $H_c$ of greater than 20 [kOe] ($1.59 \times 10^6$ [A/m]) is observed in a magnetic hysteresis loop that is measured by applying an external magnetic field in a parallel direction to an orientation direction of a magnetization easy axis.

CITATION LIST

Patent Literature

PTL 1: Japanese Patent No. 5,124,825

Non Patent Literature

NPL 1: S. Ohkoshi, A. Namai, K. Imoto, M. Yoshikiyo, W. Tarora, K. Nakagawa, M. Komine, Y. Miyamoto, T. Nasu, S. Oka, and H. Tokoro, Scientific Reports, 5, 14414/1-9 (2015).
NPL 2: S. Sakurai, A. Namai, K. Hashimoto, and S. Ohkoshi, J. Am. Chem. Soc., 131, 18299-18303 (2009).
NPL 3: A. Namai, S. Sakurai, M. Nakajima, T. Suemoto, K. Matsumoto, M. Goto, S. Sasaki, and S. Ohkoshi, J. Am. Chem. Soc., 131, 1170-1173 (2009).
NPL 4: A. Namai, M. Yoshikiyo, K. Yamada, S. Sakurai, T. Goto, T. Yoshida, T Miyazaki, M. Nakajima, T. Suemoto, H. Tokoro, and S. Ohkoshi, Nature Communications, 3, 1035/1-6 (2012).

SUMMARY OF INVENTION

Technical Problem

However, in a case where the coercive force $H_c$ of the magnetic recording medium is high, it is necessary to generate a high external magnetic field by using a magnetic head having a saturated magnetic flux density at a high level, and to record information in the magnetic recording medium. The external magnetic field that is generated by the magnetic head, in general, is also regarded as being proportional to a saturated magnetic flux density of a soft magnetic film to be used, and currently, a hard disk having a coercive force $H_c$ of approximately 1.5 to 4.5 [kOe] (1.19 to $3.58 \times 10^3$ [A/m]) has been reported, but in a record writing magnetic head of such a hard disk, a material having a high saturated magnetic flux density such as a saturated magnetic flux density of 2.4 T has been used.

As seen in PTL 1 described above, for example, in a case where epsilon iron oxide particles having a huge coercive force $H_c$ at a level of 20 [kOe] ($1.59 \times 10^6$ [A/m]) are used in the magnetic recording material of the magnetic recording medium, it is difficult to record information to the magnetic recording medium unless there is a material having a saturated magnetic flux density higher than the current saturated magnetic flux density.

Therefore, the invention has been made inconsideration of the above, and an object thereof is to propose a recording device and a recording method in which information can be easily recorded even on a magnetic recording medium having a high coercive force.

Solution to Problem

In order to attain such objects, a recording device according to the invention, includes: an external magnetic field application unit that is configured to apply an external magnetic field to a magnetic recording medium; a light irradiation unit that is configured to irradiate light; and a light focusing unit that is configured to focus the light from the light irradiation unit by resonating the light to generate an enhanced magnetic field in which a magnetic field of the light is enhanced, in which magnetization of the magnetic recording medium is inverted by applying the external magnetic field and the enhanced magnetic field to the magnetic recording medium.

A recording method of the invention, includes: focusing light by resonating the light with a light focusing unit; generating an enhanced magnetic field in which a magnetic field of the light is enhanced; applying an external magnetic field from an external magnetic field application unit and the enhanced magnetic field to a magnetic recording medium; and inverting magnetization of the magnetic recording medium.

Advantageous Effects of Invention

According to the invention, an enhanced magnetic field is obtained by resonating light with a light focusing unit, and an external magnetic field and the enhanced magnetic field are used together to invert the magnetization of a magnetic recording medium, and thus, the external magnetic field that is required to invert the magnetization can be decreased. Accordingly, even on a magnetic recording medium having a high coercive force, it is possible to easily record information in a low external magnetic field by resonating light.

BRIEF DESCRIPTION OF DRAWINGS

FIG. 21 is an image of an analysis result of MFM in the vicinity of an inner circumferential corner portion of a millimeter wave light focusing ring and an image of an electromagnetic field analysis.

DESCRIPTION OF EMBODIMENTS

Hereinafter, embodiments of the invention will be described in detail, on the basis of the drawings.

(1) Outline of Recording Device of Invention

Figure 1:
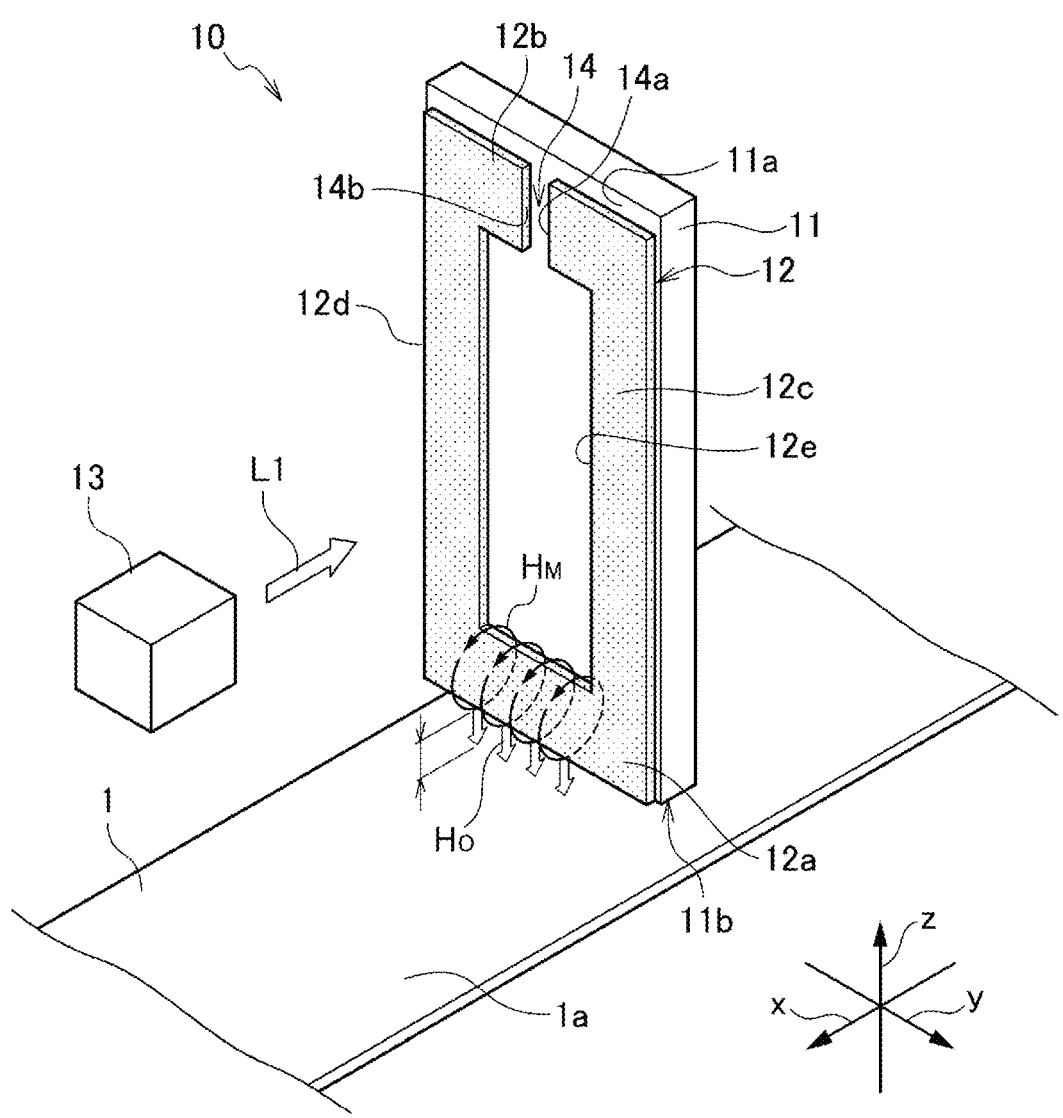
FIG. 1 is a schematic view illustrating an overall configuration of a recording device according to the invention.

First, the configuration of a recording device of the invention will be described below. As illustrated in FIG. 1, a recording device 10 of this embodiment includes an external magnetic field application unit 11, a light focusing ring 12, and a light irradiation unit 13 irradiating the light focusing ring 12 with light L1. Here, first, a case where light L1 within a millimeter wave band of 30 to 300 [GHz] is applied as the light L1 to be applied to the light focusing ring 12 will be described below. In addition, in the following embodiment, the light focusing ring 12 is referred to as a millimeter wave light focusing ring 12.

The recording device 10 includes the external magnetic field application unit 11, the millimeter wave light focusing ring 12, and the light irradiation unit 13 irradiating the millimeter wave light focusing ring 12 with the light L1 within the millimeter wave band of 30 to 300 [GHz]. In this embodiment, the external magnetic field application unit 11 is disposed such that a surface portion 11a is perpendicular to a recording surface 1a of a magnetic recording medium 1, and includes a magnetic head 11b on the end portion of the surface portion 11a. The magnetic head 11b is disposed to face the recording surface 1a with a gap of 200 [nm] or less from the recording surface 1a of the magnetic recording medium 1.

Here, the external magnetic field application unit 11, for example, is a known writing magnetic head module, and includes a coil or the like (not illustrated) inside. In the external magnetic field application unit 11, for example, a write current is applied to the coil, and thus, the magnetic head 11b facing the magnetic recording medium 1 can be magnetized, and an external magnetic field $H_0$ can be applied to the recording surface 1a from the magnetic head 11b.

In FIG. 1, a longitudinal direction of the magnetic recording medium 1 is set to x, a width direction of the magnetic recording medium 1 is set to y, a direction orthogonal to the longitudinal direction x and the width direction y is set to a thickness direction z of the magnetic recording medium 1, and the external magnetic field $H_0$ is emitted from the magnetic head 11b in the thickness direction z and is applied to the recording surface 1a.

The millimeter wave light focusing ring 12 described below is provided on the external magnetic field application unit 11. The millimeter wave light focusing ring 12 contains a metal material such as gold and platinum, and is formed into the shape of a ring including a gap 14. In this case, the millimeter wave light focusing ring 12 includes a side 12a that is disposed to face the recording surface 1a of the magnetic recording medium 1, a side 12b that is disposed to face the side 12a with a predetermined distance and includes the gap 14 formed therein, and lateral sides 12c and 12d that connect the end portions of the sides 12a and 12b, and a hollow portion 12e that is surrounded by such sides 12a and 12b and lateral sides 12c and 12d is communicated with the gap 14.

In this embodiment, in the millimeter wave light focusing ring 12, such sides 12a and 12b and lateral sides 12c and 12d are provided on the surface portion 11a of the external magnetic field application unit 11, and the side 12a is disposed to face the recording surface 1a of the magnetic recording medium 1, together with the magnetic head 11b of the external magnetic field application unit 11. In this case, the side 12a of the millimeter wave light focusing ring 12 is disposed with a gap of 200 [nm] or less from the recording surface 1a of the magnetic recording medium 1.

Here, in the millimeter wave light focusing ring 12, a length from an end portion 14a of the side 12b in which the gap 14 is formed to the other end portion 14b of the side 12b in which the gap 14 is formed through the lateral side 12c, the side 12a, and the lateral side 12d (hereinafter, also referred to as a side length) is selected such that the light L1 within the millimeter wave band of 30 to 300 [GHz] is resonated.

Accordingly, in a case where the millimeter wave light focusing ring 12 is irradiated with the light L1 within the millimeter wave band of 30 to 300 [GHz] from the light irradiation unit 13, the ring functions as a coil, and the gap functions as a condenser, and thus, an inductive current at a resonate frequency that is set by the side length is generated, and therefore, an extremely strong magnetic field is generated around the ring. Accordingly, the millimeter wave light focusing ring 12 generates an enhanced magnetic field in which in magnetic fields of the light L1, a magnetic field at a resonate frequency is enhanced (hereinafter, in this embodiment, referred to as a millimeter wave magnetic field) $H_M$ on the side 12a. The millimeter wave light focusing ring 12 applies the millimeter wave magnetic field $H_M$ in which in the magnetic fields of the light L1, the magnetic field at the resonate frequency is enhanced to the recording surface 1a from the side 12a. Note that, the millimeter wave magnetic field $H_M$ is generated over the side length of the millimeter wave light focusing ring 12, but here, will be described below by focusing on the side 12a facing the recording surface 1a.

The enhancement of the magnetic field at such a resonance frequency can be adjusted by selecting the side length of the millimeter wave light focusing ring 12. Note that, in a validation test described below, it is checked that the millimeter wave light focusing ring 12 is irradiated with the light L1, and thus, the magnetic field at the resonate frequency is 900 times the magnetic field of the light L1 applied to the millimeter wave light focusing ring 12.

Accordingly, in the recording device 10, for example, the millimeter wave light focusing ring 12 is irradiated with the light L1, and thus, the magnetization of the magnetic recording medium 1 is inverted by the assist of the millimeter wave magnetic field $H_M$ even in a low external magnetic field $H_0$ without using a magnetic head having a saturated magnetic flux density at a high level, and information can be recorded even on the magnetic recording medium 1 using epsilon iron oxide particles having a high coercive force $H_c$ as a magnetic recording material. Note that, in the recording device 10, for example, the magnetic recording medium 1 is conveyed in the longitudinal direction x, and thus, it is possible to continuously record information in the magnetic recording medium 1.

For example, pulsed light is applied as the light L1 applied from the light irradiation unit 13, but the invention is not limited thereto.

(2) Epsilon Iron Oxide Particles Used as Magnetic Recording Material in Recording Device of Invention As a magnetic recording medium of the recording device 10 of the invention, it is desirable to apply the magnetic recording medium 1 using epsilon iron oxide particles having a high coercive force $H_c$ as a magnetic recording material. In the invention, even in a case where the epsilon iron oxide particles having a high coercive force $H_c$ are used as the magnetic recording material, it is possible to invert magnetization in a low external magnetic field and to record information by using the millimeter wave magnetic field $H_M$ that is obtained by resonating the light L1 with the millimeter wave light focusing ring 12, without using a magnetic head having a saturated magnetic flux density at a high level.

Here, the epsilon iron oxide particles having a high coercive force $H_c$, which are used in this embodiment, will be described below. As the epsilon iron oxide particles, any crystals represented by general formulas of $\varepsilon\text{-Fe}_2O_3$, $\varepsilon\text{-}A_x\text{Fe}_{2-x}O_3$ (A is an element excluding Fe, and x is in a range of 0<x<2), $\varepsilon\text{-}B_yC_z\text{Fe}_{2-y-z}O_3$ (here, B and C are elements excluding A and Fe and are elements different from each other, y is in a range of 0<y<1, and z is in a range of 0<z<1), $\varepsilon\text{-}D_UE_VF_W\text{Fe}_{2-U-V-W}O_3$ (here, D, E, and F are elements excluding A and Fe and are elements different from each other, U is in a range of 0<U<1, V is in a range of 0<V<1, and W is in a range of 0<W<1) are desirable.

$\varepsilon\text{-}A_x\text{Fe}_{2-x}O_3$ has the same crystalline system and the same space group as those of $\varepsilon\text{-Fe}_2O_3$, in which a part of a Fe site of the $\varepsilon\text{-Fe}_2O_3$ crystals is substituted with the element A other than Fe. In order to stably retain a crystalline structure of $\varepsilon\text{-Fe}_2O_3$, it is preferable to use a trivalent element as A. Further, examples of A are capable of including one type of element selected from Al, Sc, Ti, V, Cr, Ga, In, Y, and Rh.

$\varepsilon\text{-}B_yC_z\text{Fe}_{2-y-z}O_3$ has the same crystalline system and the same space group as those of $\varepsilon\text{-Fe}_2O_3$, in which a part of a Fe site of the $\varepsilon\text{-Fe}_2O_3$ crystals is substituted with two types of elements B and C other than Fe. In order to stably retain a crystalline structure of $\varepsilon\text{-Fe}_2O_3$, it is preferable to use a tetravalent element as B and to use a divalent element as C. Further, examples of B are capable of including Ti, and examples of C are capable of including one type of element selected from Co, Ni, Mn, Cu, and Zn.

$\varepsilon\text{-}D_UE_VF_W\text{Fe}_{2-U-V-W}O_3$ has the same crystalline system and the same space group as those of $\varepsilon\text{-Fe}_2O_3$, in which a part of a Fe site of the $\varepsilon\text{-Fe}_2O_3$ crystals is substituted with three types of elements D, E, and F other than Fe. In order to stably retain a crystalline structure of $\varepsilon\text{-Fe}_2O_3$, it is preferable to use a trivalent element as D, to use a tetravalent element as E, and to use a divalent element as F. Examples of D are capable of including one type of element selected from Al, Sc, Ti, V, Cr, Ga, In, Y, and Rh. In addition, examples of E are capable of including Ti, and examples of F are capable of including one type of element selected from Co, Ni, Mn, Cu, and Zn.

The reason for excluding Fe from A, B, C, D, E, and F described above is because a part of a $Fe^{3+}$ ion site of $\varepsilon\text{-Fe}_2O_3$ is substituted with one type of element, or two types or three types of elements different from each other. Here, a particle diameter of the epsilon iron oxide particles is not particularly limited, and for example, it is desirable that an average particle diameter measured from a transmission-type electron microscope (TEM) picture is in a range of 5 to 200 [nm], and in order to increase a recording density of the magnetic recording medium 1, the average particle diameter is more desirably 100 [nm] or less, is even more desirably 50 [nm] or less, and is still even more desirably 20 [nm] or less.

Such epsilon iron oxide particles are known. The epsilon iron oxide particles containing any of the $\varepsilon\text{-}A_x\text{Fe}_{2-x}O_3$ crystals, the $\varepsilon\text{-}B_yC_z\text{Fe}_{2-y-z}O_3$ crystals, and the $\varepsilon\text{-}D_UE_VF_W\text{Fe}_{2-U-V-W}O_3$ crystals in which a part of the Fe site is substituted with one type of element A, two types of elements B and C, and three types of elements D, E, and F, other than Fe, for example, can be synthesized by a step in which a reverse-micelle method and a sol-gel method are combined, and a burning step. In addition, as disclosed in JP-A-2008-174405, the epsilon iron oxide particles can be synthesized by a step in which a direct synthesis method and a sol-gel method are combined, and a burning step.

A more specific manufacturing method, for example, is disclosed in "Jian Jin, Shinichi Ohkoshi and Kazuhito Hashimoto, ADVANCED MATERIALS 2004, 16, No. 1, January 5, p. 48-51" or "Shin-ichi Ohkoshi, Shunsuke Sakurai, Jian Jin, Kazuhito Hashimoto, JOURNAL OF APPLIED PHYSICS, 97, 10K312 (2005)", which is known literature, and thus, here, the description thereof will be omitted.

(3) Magnetic Recording Medium Containing Epsilon Iron Oxide Particles

The magnetic recording medium 1 used in the recording device 10 of this embodiment, for example, is manufactured as follows. A dispersion liquid obtained by dispersing the epsilon iron oxide particles described above in a predetermined solvent is provided on a base. For example, a polyester film is pasted onto a glass substrate, and the dispersion liquid is dropped onto the film. The dispersion liquid provided on the base is placed at a magnetic flux density of 2 teslas or more from the viewpoint of increasing orientation reliability, and the dispersion liquid is cured, and thus, a film-like particle dispersion element can be obtained. Note that, a detailed manufacturing method of such a film-like particle dispersion element is disclosed in JP-A-2016-135737, and thus, here, the description thereof will be omitted.

In the magnetic recording medium 1 that is manufactured as described above, for example, it is desirable that the value of the degree of orientation of magnetic particles, which is defined by Degree of Orientation=SQ (Magnetization Easy Axis Direction)/SQ (Magnetization Hard Axis Direction), is greater than 0.6. In addition, in the particle dispersion element in which the magnetization easy axis of the epsilon iron oxide particles is oriented toward a predetermined direction, it is desirable that the coercive force $H_c$ at a room temperature is 3 [kOe] ($2.39 \times 10^3$ [A/m]) or more.

Figure 2A:
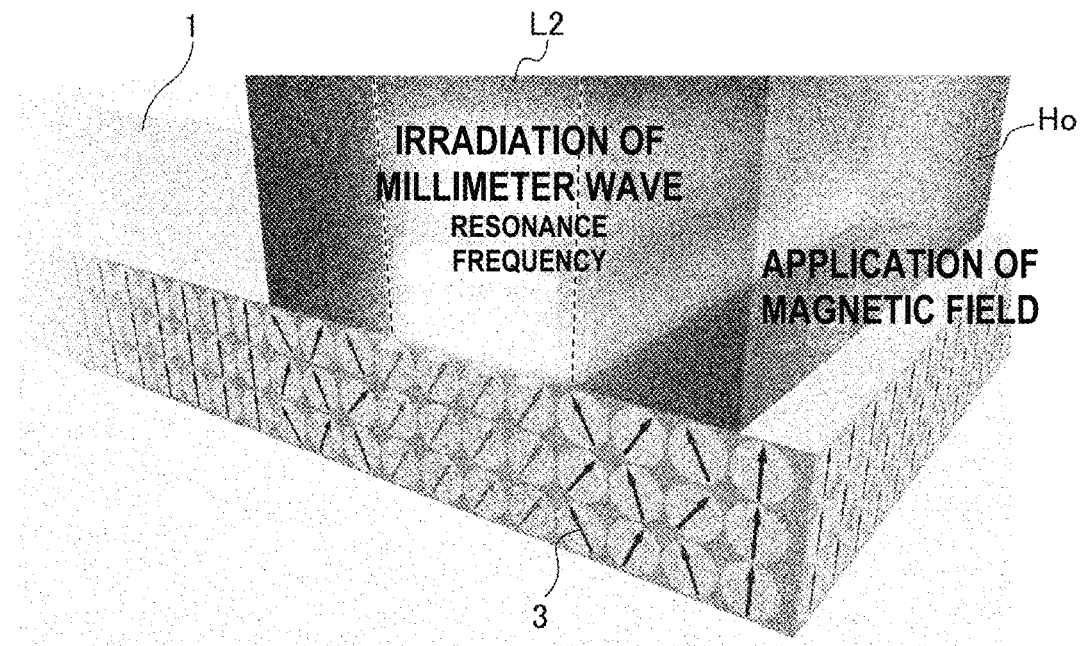
FIG. 2A is a schematic view for describing a case where magnetization of a magnetic recording medium is inverted by irradiating the magnetic recording medium with light in a millimeter wave band after an external magnetic field is applied to the magnetic recording medium.

(4) Magnetization Inversion Method of Magnetic Recording Medium, in which Application of External Magnetic Field and Irradiation of Light in Millimeter Wave Band are Combined Here, the outline of a magnetization inversion method of the magnetic recording medium 1, in which the application of the external magnetic field $H_0$ and the irradiation of light in a millimeter wave band are combined, will be described below. FIG. 2A is a schematic view simply illustrating magnetization 3 of the magnetic recording medium 1. In FIG. 2A, when the application of the external magnetic field $H_0$ and the irradiation of light L2 in the millimeter wave band are not performed, a magnetization direction of the magnetization 3, for example, is oriented in a reverse direction of an external magnetic field direction (hereinafter, referred to as an initial orientation direction). Note that, here, the light L2 in the millimeter wave band, illustrated in FIG. 2A, corresponds to light that is focused by resonating the light L1 with the millimeter wave light focusing ring 12, and is light having a millimeter wave magnetic field $H_M$.

As illustrated in FIG. 2A, in a case where the external magnetic field $H_0$ is applied toward the surface of the magnetic recording medium 1, in the magnetic recording medium 1, the magnetization 3 within a region to which the external magnetic field $H_0$ is applied (in FIG. 2A, represented as "magnetic field application") is affected to be inclined by the external magnetic field $H_0$. At this time, in a case where the epsilon iron oxide particles having a high coercive force $H_c$ are used as the magnetic recording material, it is difficult to invert the magnetization 3 by 180 degrees only with the external magnetic field $H_0$, the magnetization 3 is merely inclined, and thus, it is not possible to record information.

In a case where the light L2 in the millimeter waveband that is a resonance frequency of the epsilon iron oxide particles is applied in a state where the external magnetic field $H_0$ is applied, in a region irradiated with the light L2 in the millimeter wave band (in FIG. 2A, represented as "millimeter wave irradiation"), the magnetization 3 inclined by the external magnetic field $H_0$ is excited with the light L2 in the millimeter wave band, and starts a precession movement, and finally, the magnetization direction is inverted from the initial orientation direction by 180 degrees. Note that, the resonance frequency of the epsilon iron oxide particles indicates a frequency having a peak in which an electromagnetic wave absorption amount of the epsilon iron oxide particles is maximized within the millimeter wave band of 30 to 300 [GHz].

Figure 2B:
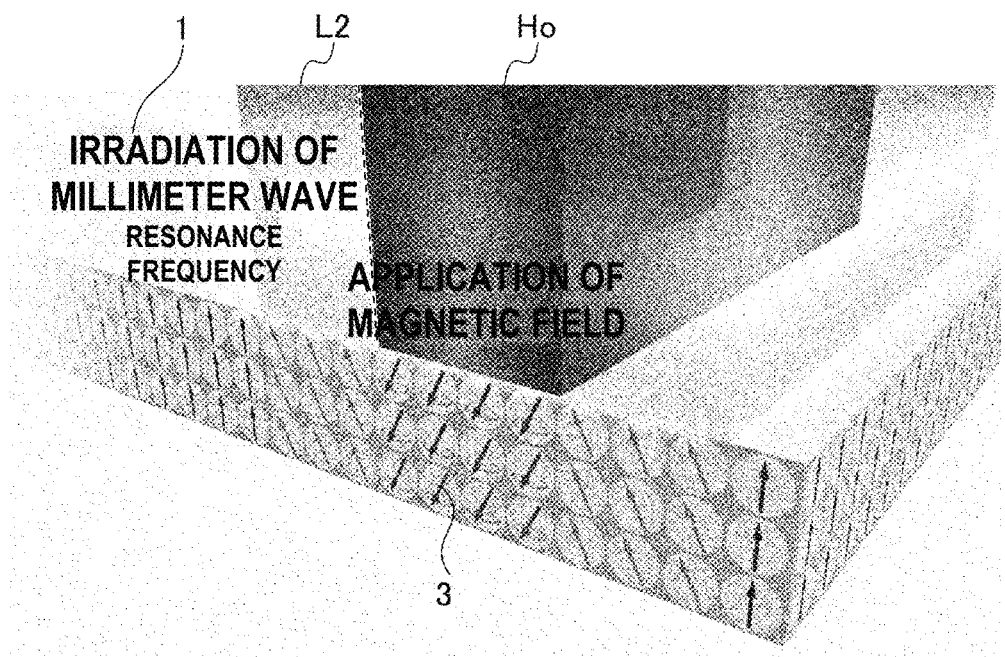
FIG. 2B is a schematic view for describing a case where magnetization of a magnetic recording medium is inverted by applying an external magnetic field to the magnetic recording medium after the magnetic recording medium is irradiated with light in a millimeter wave band.

In the embodiment described above, a case has been described in which the light L2 in the millimeter wave band that is the resonance frequency of the epsilon iron oxide particles is applied in a state where the external magnetic field $H_0$ is applied to the magnetic recording medium 1, and thus, the light L2 in the millimeter wave band assists the magnetization inversion, and the magnetization direction is inverted from the initial orientation direction by 180 degrees, but as illustrated in FIG. 2B, the external magnetic field Ho may be applied in a state where the magnetic recording medium 1 is irradiated with the light L2 in the millimeter wave band that is the resonance frequency of the epsilon iron oxide particles. In this case, the external magnetic field $H_0$ assists the magnetization inversion, and the magnetization direction is inverted from the initial orientation direction by 180 degrees.

Here, a phenomenon that the magnetization 3 is inverted by the application of the external magnetic field $H_0$ and the irradiation of the light L2 in the millimeter wave band (hereinafter, also referred to as a magnetization inversion process) will be described below by using FIG. 3A, FIG. 3B, and FIG. 3C, from the viewpoint of potential energy.

Figure 3A:
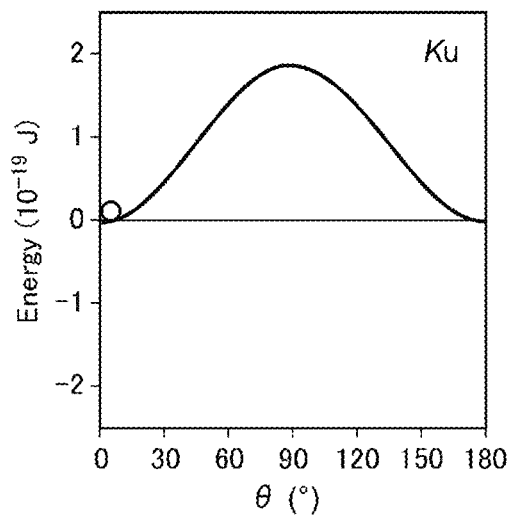
FIG. 3A is a schematic view illustrating an energy potential (before light irradiation) of a magnetization inversion process.

FIG. 3A illustrates an energy potential when the external magnetic field $H_0$ is not applied and the light L2 in the millimeter wave band is not applied. The magnetization direction in a magnetization stable position directed in the initial orientation direction is set to 0 degrees, and the magnetization direction in a magnetization stable position subjected to the magnetization inversion is set to 180 degrees, on a horizontal axis of FIG. 3A. In this case, an energy minimum portion appears in the vicinity of 0 degrees and in the vicinity of 180 degrees, and an energy barrier of the magnetization inversion appears between 0 degrees and 180 degrees.

The magnetization 3 in the vicinity of 0 degrees is not capable of being inverted by the energy barrier. After that, in a case where the external magnetic field $H_0$ is applied, as illustrated in FIG. 3B, the energy potential is changed, and the energy potential in the vicinity of 0 degrees increases, the energy potential in the vicinity of 180 degrees decreases, and the energy minimum portion appears in the vicinity of 180 degrees. However, the energy barrier of the magnetization inversion still exists between 0 degrees and 180 degrees, and the magnetization direction of 0 degrees is maintained.

Figure 3B:
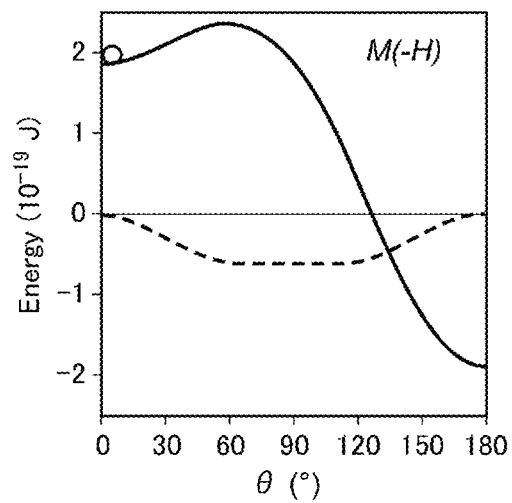
FIG. 3B is a schematic view illustrating an energy potential (at the time of applying an external magnetic field) of a magnetization inversion process.
Figures 3C, 4:
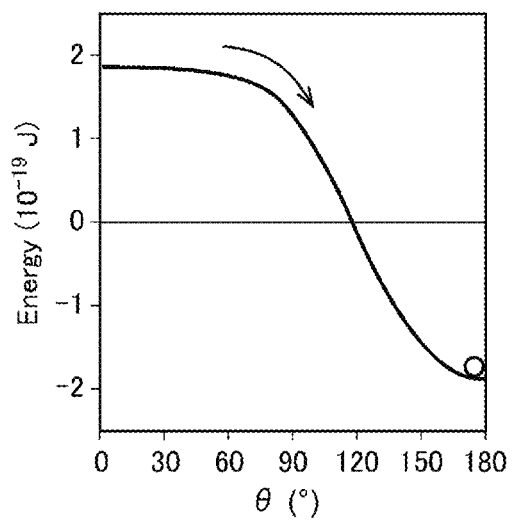
FIG. 3C is a schematic view illustrating an energy potential (at the time of applying an external magnetic field and light irradiation) of a magnetization inversion process.
FIG. 4 is a table showing a result obtained by statistical thermodynamical calculation with respect to a relationship in an external magnetic field, a magnetic field of light, and a coercive force.

In such a state, in a case where the light L2 in the millimeter wave band that is the resonance frequency of the epsilon iron oxide particles is applied, energy in a dotted line illustrated in FIG. 3B is applied, and as illustrated in FIG. 3C, exceeds the energy barrier of the magnetization inversion, and the magnetization 3 is inverted, and thus, the vicinity of 180 degrees becomes the magnetization stable position.

Here, FIG. 4 is a table in which a calculation result obtained by statistical thermodynamical calculation with respect to a relationship in the external magnetic field $H_0$, a magnetic field $H_{millimeter}$ of light in a millimeter wave band that is not focused by the millimeter wave light focusing ring (hereinafter, also referred to as "unfocused light in a millimeter wave band"), and the coercive force $H_c$ of the magnetic recording medium 1 is summarized. As illustrated in FIG. 4, for example, it is found that light in a millimeter wave band of a magnetic field $H_{millimeter}$ of 1100 [Oe] is applied in a state where an external magnetic field $H_0$ of 3000 [Oe] is applied, and thus, the magnetization of the magnetic recording medium 1 having a coercive force $H_c$ of 6000 [Oe] can be inverted.

Figure 5:
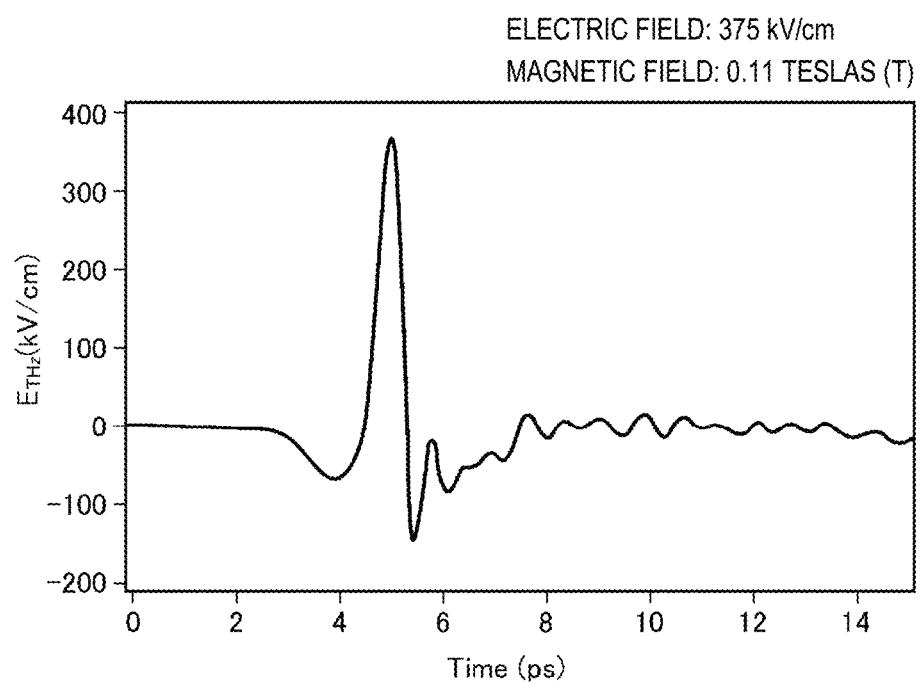
FIG. 5 is a graph showing an electric field intensity of light in a millimeter wave band that is applied to a millimeter wave light focusing ring.

For example, FIG. 5 shows an example of the unfocused light in the millimeter wave band and is a graph showing time dependency of an electric field. It has been checked that a magnetic field 0.11 [T] can be attained by such unfocused light in the millimeter wave band, but the value of the magnetic field is the total amount value of the magnetic field in the entire wide frequency band of the millimeter wave. For this reason, in the entire wide frequency band of the millimeter wave, a magnetic field at the same frequency as the resonance frequency of the epsilon iron oxide particles is less than approximately 1% of the total of 0.11 [T]. For this reason, the magnetic field at the same frequency as the resonance frequency of the epsilon iron oxide particles is extremely reduced by the unfocused light in the millimeter wave band, and for example, in actuality, it is difficult to invert the magnetization of the magnetic recording medium 1 having a coercive force $H_c$ of 6000 [Oe] even in the case of applying the unfocused light in the millimeter wave band, illustrated in FIG. 5 in a state where an external magnetic field $H_0$ of 3000 [Oe] is applied.

Figure 6:
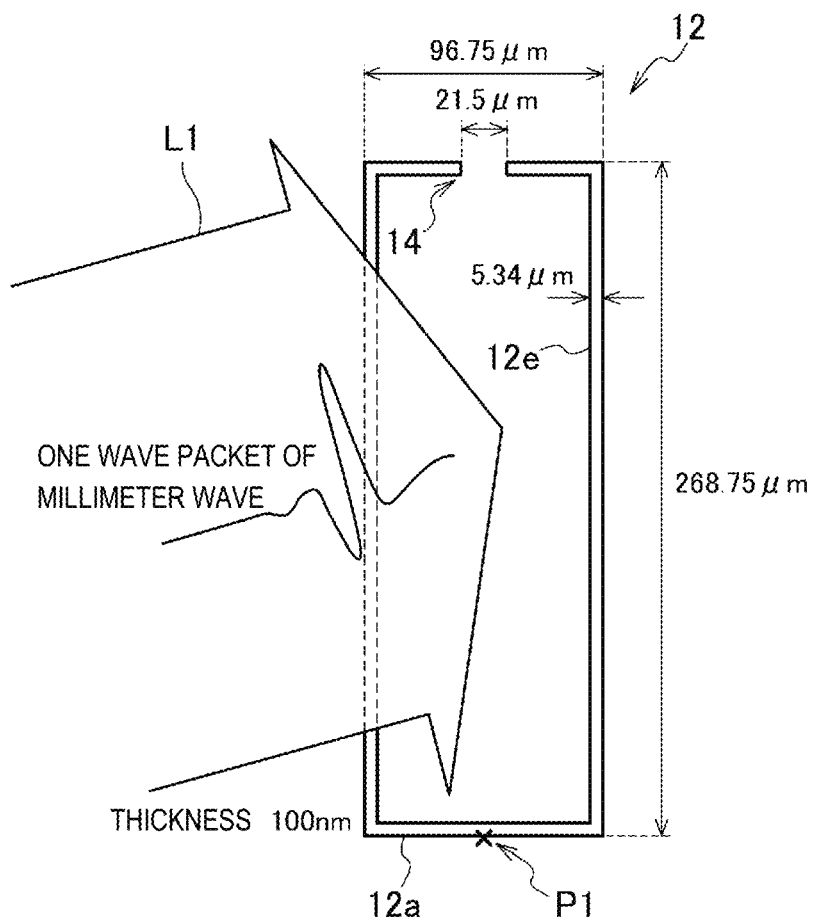
FIG. 6 a schematic view for describing a configuration of a millimeter wave light focusing ring and irradiation of light to the millimeter wave light focusing ring.

Therefore, in this embodiment, as illustrated in FIG. 6, the millimeter wave light focusing ring 12 is irradiated with the light L1 in the millimeter wave band, the light L1 is resonated at the resonance frequency of the magnetic recording medium 1 by the millimeter wave light focusing ring 12, and the magnetic field at the resonate frequency is enhanced. As described above, for example, even in a case where the external magnetic field $H_0$ of 3000 [Oe] is applied, the magnetization of the magnetic recording medium 1 having a high coercive force $H_c$ of 6000 [Oe] can be inverted by using the millimeter wave magnetic field $H_M$ that is obtained by resonating the light L1 with the millimeter wave light focusing ring 12.

(5) Validation Test (5-1) Simulation Test Using FDTD Method

Next, a light focusing ring performing resonance at 220 [GHz] and 660 [GHz] (here, simply referred to as a light focusing ring without being referred to as a millimeter wave light focusing ring since the resonance is also performed at 660 [GHz]) was designed, a simulation test using a finite-difference time-domain method (hereinafter, referred to as an FDTD method) was performed, and electromagnetic field analysis was performed. FIG. 6 illustrates the rectangular light focusing ring 12 used in the simulation test. The light focusing ring 12 was designed to have a width of 96.75 [µm], a gap 14 of 21.5 [µm], a height of 268.75 [µm], a line width of 5.34 [µm], and a thickness in depth of 100 [nm] and to resonate light at 220 [GHz] or 660 [GHz].

The light focusing ring 12 used in the simulation test was defined as a metal that is a perfect conductor floating in the vacuum. Then, electromagnetic field analysis when the light focusing ring 12 was irradiated with light as illustrated in FIG. 5 (hereinafter, the light L1) was performed by the simulation test using the FDTD method. Note that, the light L1 applied to the light focusing ring 12 was defined as linearly polarized light applied perpendicular to the light focusing ring 12.

Figure 7:
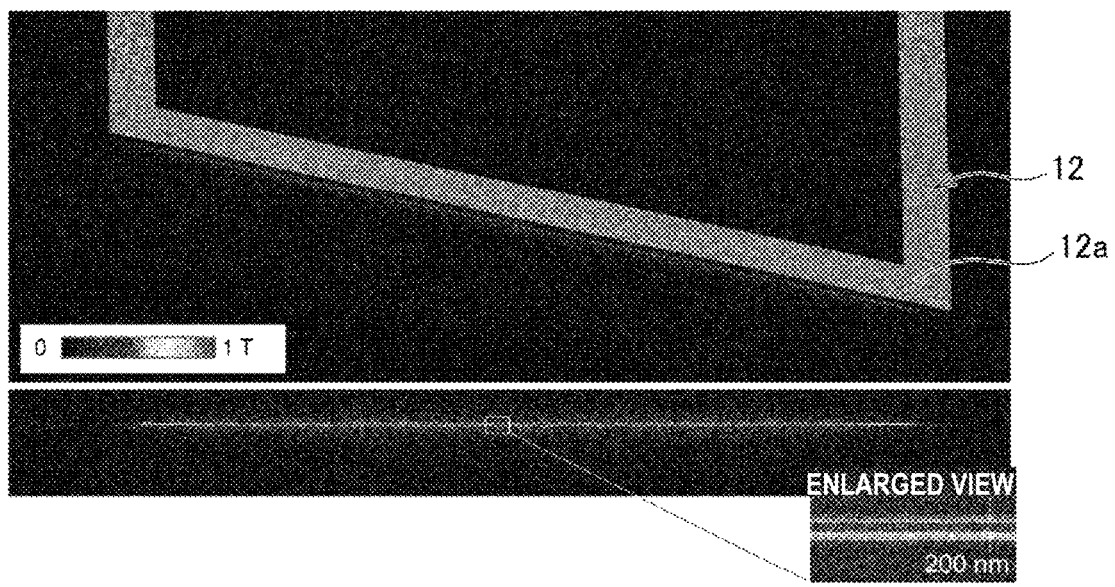
FIG. 7 is an image of a magnetic field distribution at a distance of 30 [nm] from a millimeter wave light focusing ring by electromagnetic field analysis.

In the light focusing ring 12, frequency dependency of a magnetic field generated in a position Pi of 30 [nm] outside the side 12a that is a short side without including the gap 14 was analyzed on the basis of the simulation test using the FDTD method. FIG. 7 illustrates an electromagnetic field analysis result of the simulation test using the FDTD method. Note that, FIG. 7, in actuality, is a color image, in which it is illustrated that an electric field intensity is high in the order of Red>Orange>Yellow>Green>Blue>Violet, and a magnetic field is large in a warm color system.

Figure 8A:
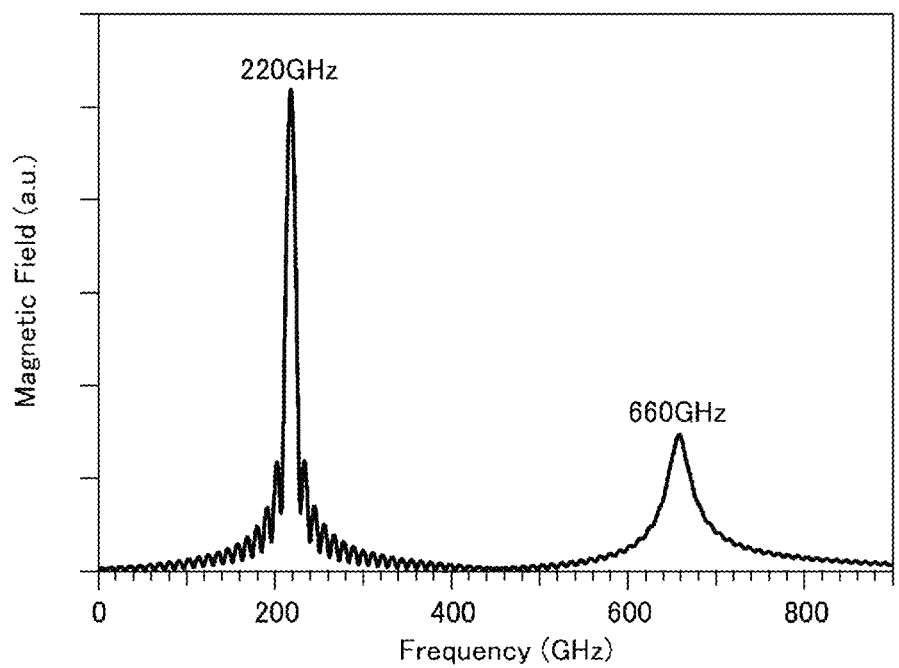
FIG. 8A is a graph showing a calculation result calculating a magnetic field intensity at the time of resonating light with a light focusing ring that resonates light of 220 [GHz] or 660 [GHz] by electromagnetic field analysis in a range of 100 to 900 [GHz].
Figure 8B:
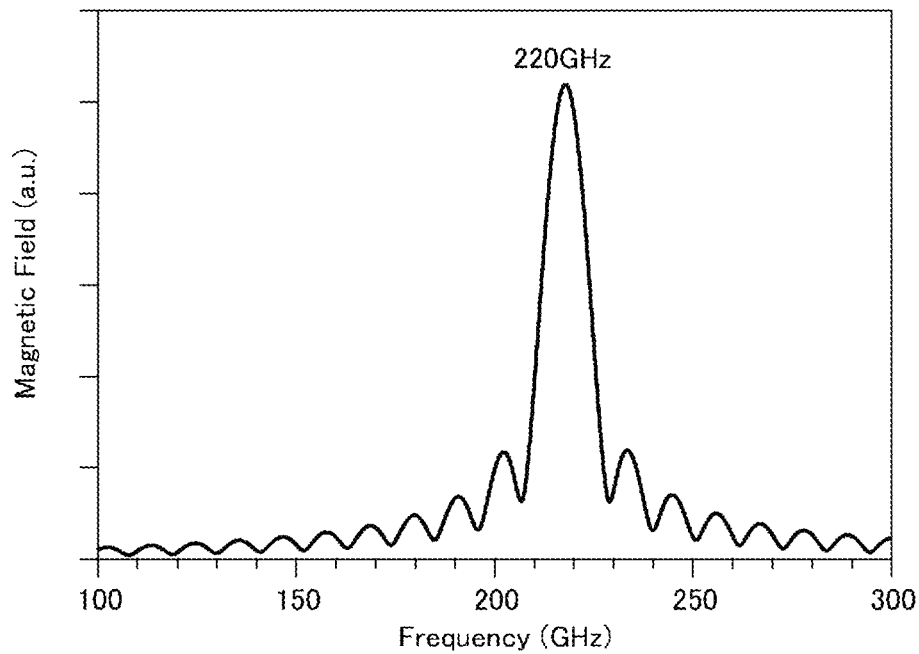
FIG. 8B is a graph enlargedly showing a calculation result calculating a magnetic field intensity at the time of resonating light with a light focusing ring that resonates light of 220 [GHz] or 660 [GHz] by electromagnetic field analysis in a range of 100 to 300 [GHz].

From FIG. 7, it was possible to check that in the position of 30 [nm] outside the side 12a, a high magnetic field having a thickness of 200 [nm] was generated. In addition, from the result of FIG. 7, the magnetic field generated in the position of 30 [nm] outside the side 12a was calculated, as a result thereof, a calculation result as illustrated in FIG. 8A was obtained, and it was found that the resonance was performed not only at 220 [GHz] but also at 660 [GHz] that is not the millimeter wave band. From FIG. 8B, it was possible to check that the magnetic field at 220 [GHz] was approximately 900 times an input magnetic field input to the light focusing ring 12.

As described above, according to such a validation test, even in a case where the light focusing ring 12 was irradiated with the light L1 within a subterahertz wave band of 660 [GHz] greater than 300 [GHz], the light L1 was capable of being resonated by the light focusing ring 12. Accordingly, it was possible to check that an enhanced magnetic field was obtained in which a magnetic field of the light L1 within the subterahertz wave band was enhanced. For this reason, in the recording device 10 of this embodiment, not only the light within the millimeter wave band of 30 to 300 [GHz] but also the light within the subterahertz wave band of 100 to 1000 [GHz] can be used. Note that, here, in a case where the frequency of light is greater than 1000 [GHz], it is assumed that a ring size is approximately 10 [µm], and a recording width of the recording head decreases, and thus, in the case of ensuring a certain level of recording width, it is desirable that the frequency of the light L1 is 1000 [GHz] or less.

Figure 9:
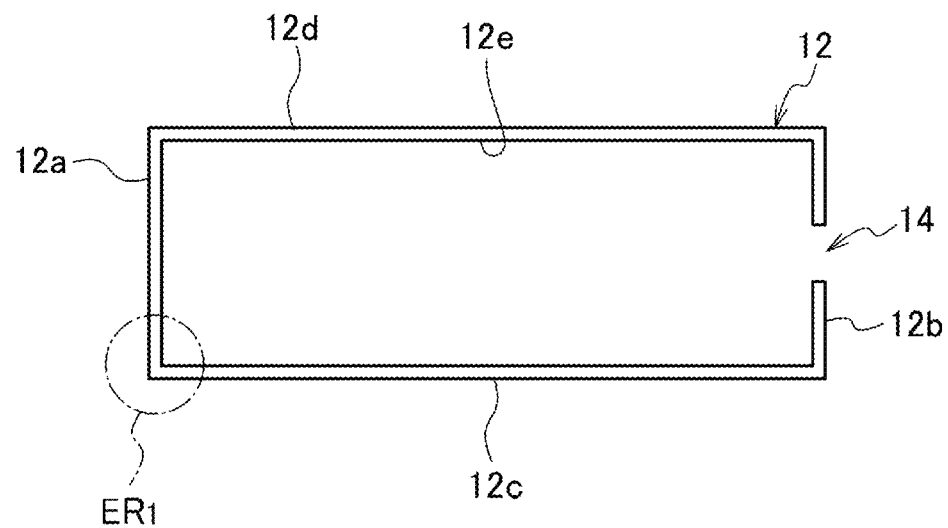
FIG. 9 is a schematic view illustrating a region in a millimeter wave light focusing ring that is focused in performing electromagnetic field analysis.

Next, the millimeter wave light focusing ring 12 resonating light at 79 [GHz] or 240 [GHz] was designed, the simulation test using the FDTD method was performed, and the electromagnetic field analysis was performed. FIG. 9 illustrates the millimeter wave light focusing ring 12 used in the simulation test. The millimeter wave light focusing ring 12 is designed such that the side 12a or the lateral sides 12c and 12d, the gap 14, the line width, and the like resonate with the light at 79 [GHz] or 240 [GHz].

In the simulation test, the light L1 in the millimeter wave band applied to the millimeter wave light focusing ring was defined as linearly polarized light applied perpendicular to the millimeter wave light focusing ring 12. Then, the simulation test using the FDTD method was performed by changing the angle of the light L1 in the millimeter wave band applied toward the center portion of the millimeter wave light focusing ring 12 from the front surface of the millimeter wave light focusing ring 12.

Specifically, a simulation test when the light L1 in the millimeter wave band was applied perpendicular (0 [deg]) to the millimeter wave light focusing ring 12 and a simulation test when the light L1 in the millimeter wave band was applied toward the short side of the millimeter wave light focusing ring 12 at an angle of 30 [deg] were performed. In addition, similarly, a simulation test when the light L1 in the millimeter wave band was applied toward the short side of millimeter wave light focusing ring 12 at an angle of 45 [deg] and a simulation test when the light L1 in the millimeter wave band was applied toward the short side of the millimeter wave light focusing ring 12 at an angle of 60 [deg] were performed.

Figure 10A:
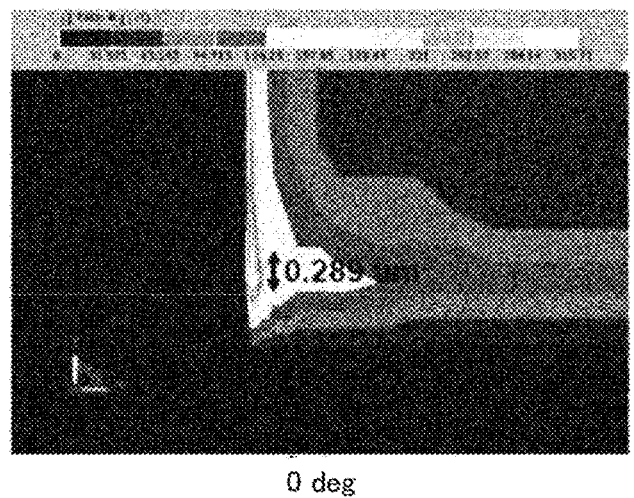
FIG. 10A is an image of an electromagnetic field analysis at the time of irradiating a millimeter wave light focusing ring with light at an angle of 0 [deg].
Figure 10B:
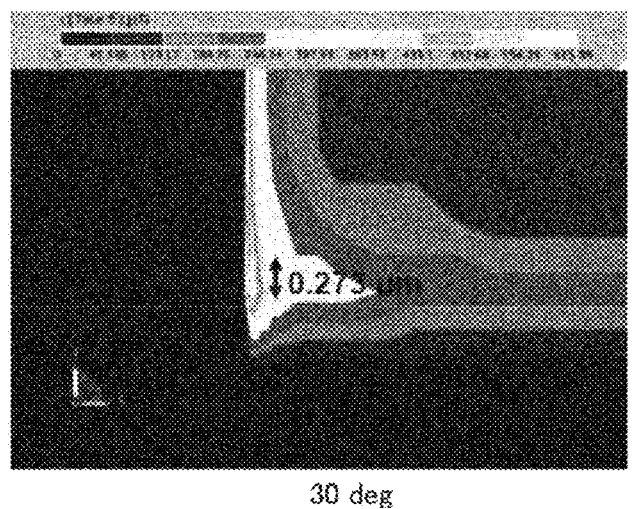
FIG. 10B is an image of an electromagnetic field analysis at the time of irradiating a millimeter wave light focusing ring with light at an angle of 30 [deg].
Figure 10C:
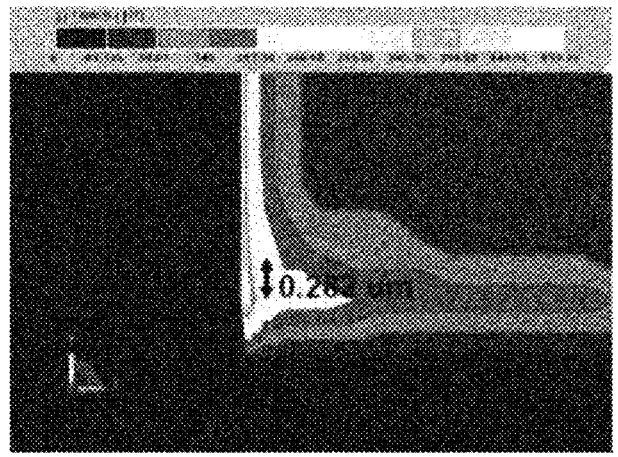
FIG. 10C is an image of an electromagnetic field analysis at the time of irradiating a millimeter wave light focusing ring with light at an angle of 45 [deg].
Figure 10D:
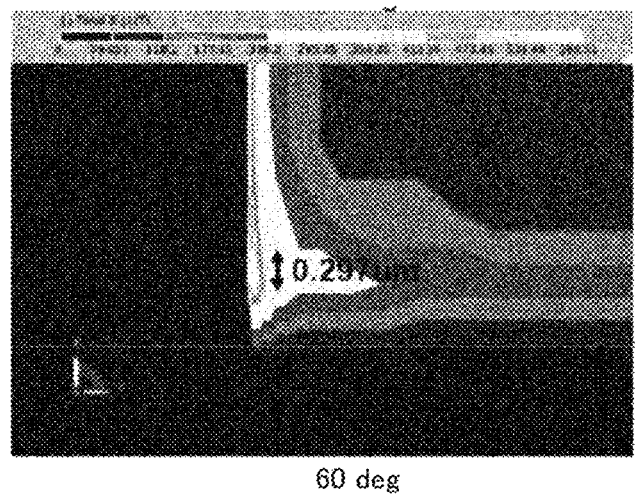
FIG. 10D is an image of an electromagnetic field analysis at the time of irradiating a millimeter wave light focusing ring with light at an angle of 60 [deg].

In the simulation test using the FDTD method, each electromagnetic field analysis was performed by focusing on a region $ER_1$ in the vicinity of the corner portion of the millimeter wave light focusing ring 12 illustrated in FIG. 9. As a result thereof, a result as illustrated in FIG. 10A to FIG. 10D was obtained. FIG. 10A illustrates an electromagnetic field analysis result when the light L1 in the millimeter wave band was applied at 0 [deg], FIG. 10B illustrates an electromagnetic field analysis result when the light L1 in the millimeter wave band was applied at 30 [deg], FIG. 10C illustrates an electromagnetic field analysis result when the light L1 in the millimeter wave band was applied at 45 [deg], and FIG. 10D illustrates an electromagnetic field analysis result when the light L1 in the millimeter wave band was applied at 60 [deg].

From the result of FIG. 10A to FIG. 10D, it was possible to check that the magnetic field of the light L1 in the millimeter wave band was enhanced even in a case where an irradiation angle of the light L1 in the millimeter wave band was changed with respect to the millimeter wave light focusing ring 12. In addition, it was possible to check that the enhancement of the magnetic field slightly increased in the case of increasing the irradiation angle of the light L1 in the millimeter wave band with respect to the millimeter wave light focusing ring 12. Further, it was possible to check that the magnetic field was further enhanced in the corner portion on the side 12a of the millimeter wave light focusing ring 12, regardless of the irradiation angle of the light L1 in the millimeter wave band. Note that, a numerical value of "0.289 µm" represented in FIG. 10A indicates the width of a portion of 90% or more of the maximum value of the magnetic field. The same applies to FIG. 10B to FIG. 10D.

Figure 11A:
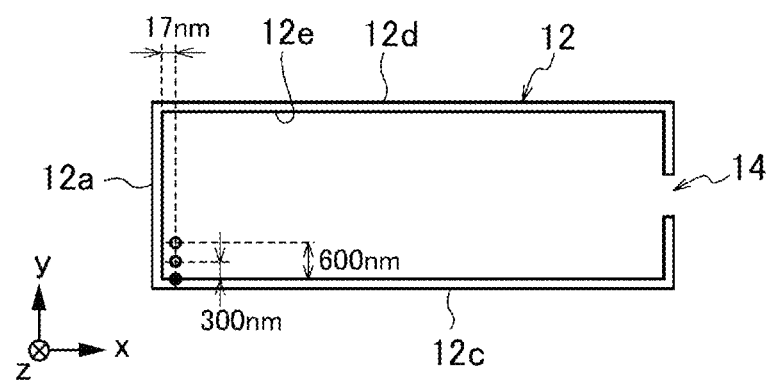
FIG. 11A is a schematic view illustrating a position in a millimeter wave light focusing ring in which a degree of magnetic field enhancement in a depth direction z is analyzed.

Next, in the millimeter wave light focusing ring 12 resonating the light at 79 [GHz], the simulation test using the FDTD method was performed in a case where the light L1 in the millimeter wave band was applied at 0 [deg], and as illustrated in FIG. 11A, the degree of magnetic field enhancement in a depth direction z was calculated in three portions in vicinity of the inner circumferential corner portion of the millimeter wave light focusing ring 12. Specifically, in a position of 17 [nm] inside from the side 12a of the millimeter wave light focusing ring 12, the degree of magnetic field enhancement in the depth direction z was calculated in each position in which a distance from the lateral side 12c was 0 [nm], 300 [nm], and 600 [nm].

Figure 11B:
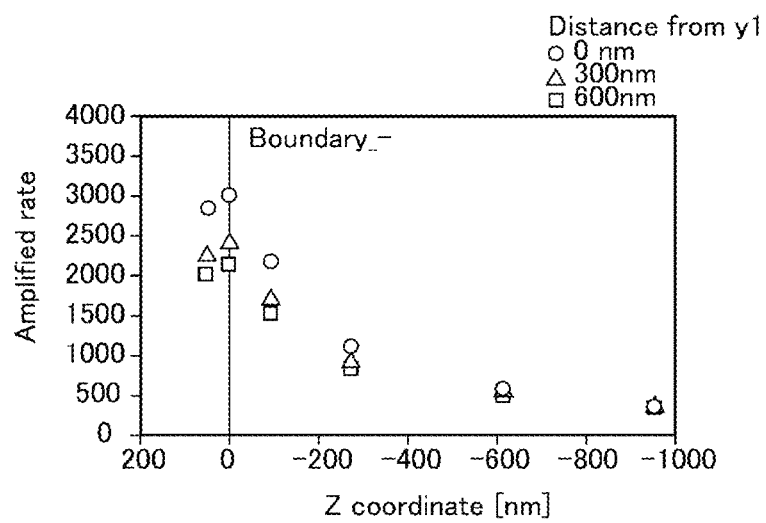
FIG. 11B is a graph showing a degree of magnetic field enhancement in a depth direction z that is calculated for each position.
Figure 11C:
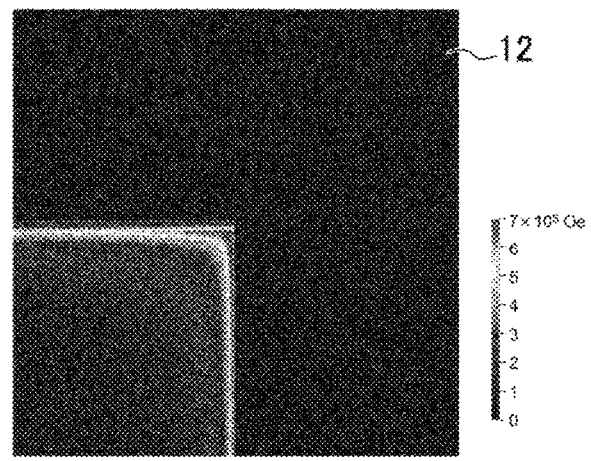
FIG. 11C is an image of an electromagnetic field analysis.

As a result thereof, a result as illustrated in FIG. 11B was obtained. From FIG. 11B, it was possible to check that the degree of magnetic field enhancement decreased as being separated from the lateral side 12c of the millimeter wave light focusing ring 12, but a high degree of magnetic field enhancement was obtained even in a position of 600 [nm] farthest from the lateral side 12c and a position separated by −1000 [nm] in the depth direction z. In addition, according to the simulation test using the FDTD method, a magnetic field distribution in the vicinity of the inner circumferential corner portion of the millimeter wave light focusing ring 12 in the position in which the distance in the depth direction z was 0 [nm] was examined by the electromagnetic field analysis, and as a result thereof, a result as illustrated in FIG. 11C was obtained. From the electromagnetic field analysis result of FIG. 11C, it was possible to check that a strong magnetic field was distributed along the edge of the millimeter wave light focusing ring 12, and the magnetic field was particularly strong in the corner portion.

(5-2) Validation Test Using Sample in which Millimeter Wave Light Focusing Ring is Attached onto Magnetic Film Next, a magnetic film was actually prepared as the magnetic recording medium, a millimeter wave magnetic field was generated by the millimeter wave light focusing ring 12 directly formed on the magnetic film, and a validation test of checking whether or not it was possible to invert the magnetization of the magnetic film by the millimeter wave magnetic field and the external magnetic field was performed.

(5-2-1) Preparation of Magnetic Film onto which Millimeter Wave Light Focusing Ring is Attached Here, first, the epsilon iron oxide particles containing the $\varepsilon\text{-Ga}_{0.22}\text{Ti}_{0.05}\text{Co}_{0.07}\text{Fe}_{1.68}\text{O}_3$ crystals synthesized by a known method were dispersed in a dispersion liquid containing tetramethyl ammonium hydroxide (TMAH), and were classified by a centrifugal separation treatment, and thus, a powder sample having a homogeneous particle diameter was obtained. The powder sample was observed with a transmission-type electron microscope (TEM), and as a result thereof, it was possible to check that the powder sample was spherical particles. Next, the magnetic film used in the validation test was prepared by using the powder sample. Note that, the epsilon iron oxide particles containing the $\varepsilon\text{-Ga}_{0.22}\text{Ti}_{0.05}\text{Co}_{0.07}\text{Fe}_{1.68}\text{O}_3$ crystals are a known product, and it is checked that the maximized peak of the electromagnetic wave absorption amount (that is, the resonance frequency at which natural resonance occurs) is 80 [GHz], and the coercive force $H_c$ is 4.3 [kOe].

In the preparation of the magnetic film, a mixture in which a urethane resin and a vinyl chloride resin were mixed was prepared, and a dispersion liquid in which the mixture and the classified powder sample were dispersed in a predetermined solvent was prepared. Next, the dispersion liquid was coated on a quartz substrate and was placed at a magnetic flux density of 2 T, and the dispersion liquid was dried, and thus, a transparent magnetic film in which the dispersion liquid was cured was formed on the quartz substrate. At this time, the magnetic film was disposed such that a magnetic flux density was applied in a perpendicular direction.

Figure 12A:
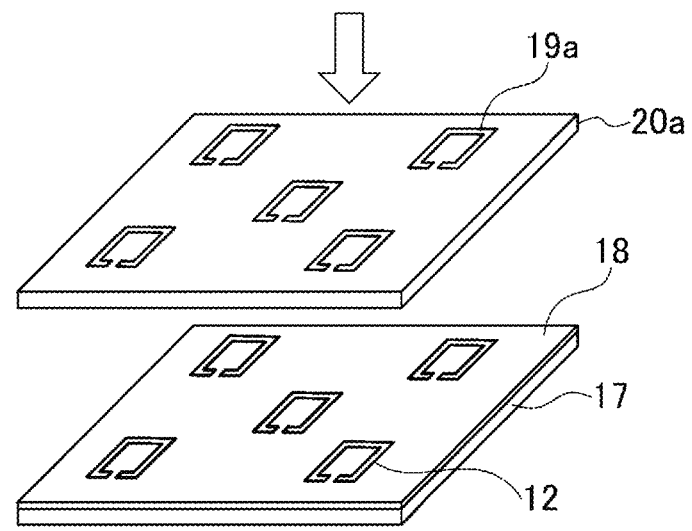
FIG. 12A is a schematic view for describing a manufacturing method of a magnetic film on which a millimeter wave light focusing ring is formed.

Next, as illustrated in FIG. 12A, a process of attaching the millimeter wave light focusing ring 12 onto a magnetic film 18 formed on the surface of a quartz substrate 17 was performed. As illustrated in FIG. 12A, first, a mask 20a including a hole 19a coincident with the outer shape of the millimeter wave light focusing ring 12 was prepared on a silicon substrate. Next, the prepared mask 20a was stacked on the magnetic film 18 formed on the surface of the quartz substrate 17, and gold was sputtered from the mask 20a side, and thus, the millimeter wave light focusing ring 12 containing Au that resonates light at 80 [GHz] or 240 [GHz] was formed on the magnetic film 18.

Figure 12B:
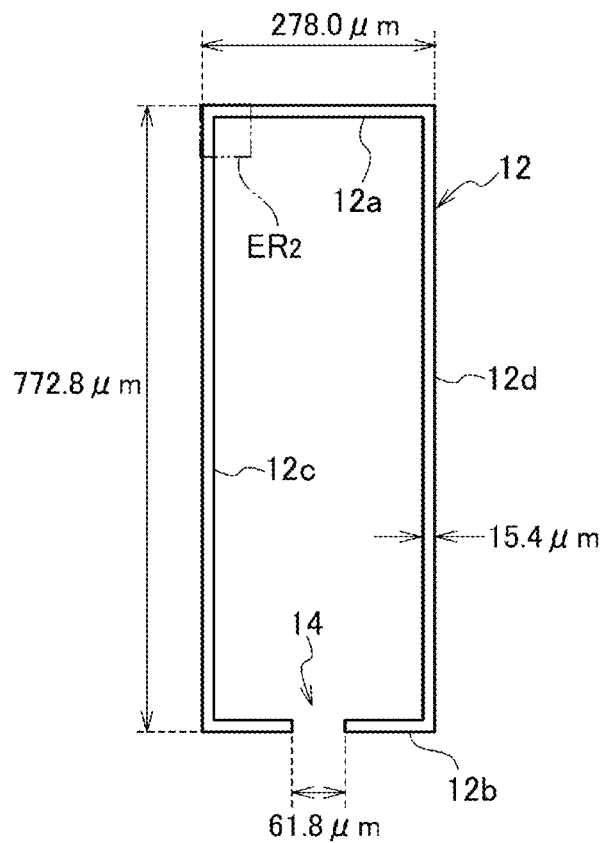
FIG. 12B is a schematic view illustrating a region in a millimeter wave light focusing ring in which analysis is performed.

Accordingly, as illustrated in FIG. 12B, the millimeter wave light focusing ring 12 in which the sides 12a and 12b to be the short side were 278.0 [μm], the gap 14 was 61.8 [μm], the lateral sides 12c and 12d to be the long side were 772.8 [μm], and the line width was 15.4 [μm] was formed on the magnetic film 18. Note that, the millimeter wave light focusing ring 12 is designed to resonate light at 80 [GHz] or 240 [GHz] on the magnetic film 18.

Figure 13:
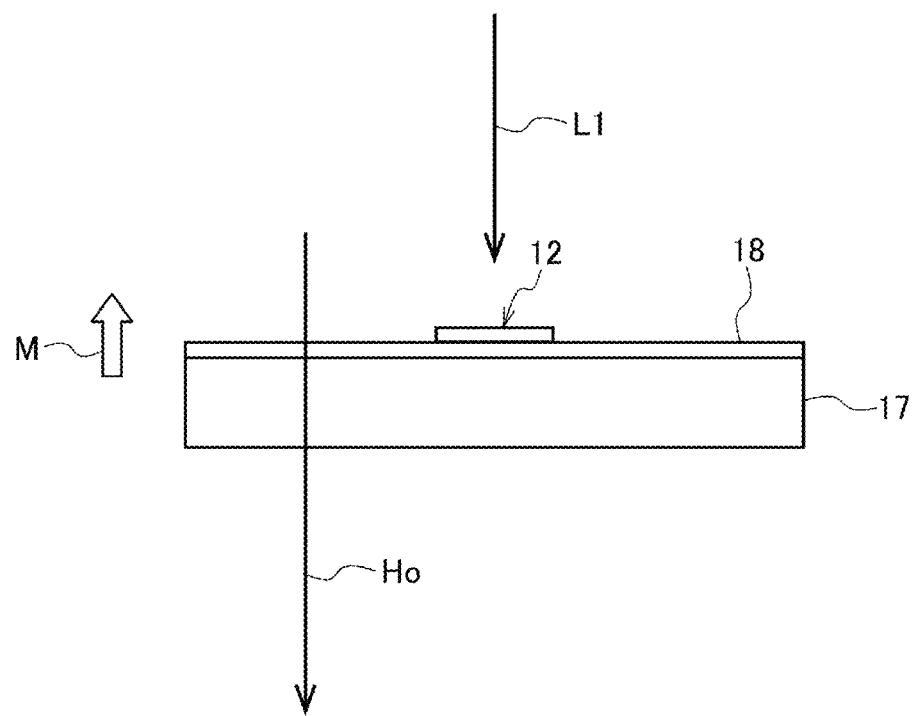
FIG. 13 is a schematic view for describing an application direction of an external magnetic field that is applied to a magnetic film and an irradiation direction of light of 79 [GHz] that is applied to a millimeter wave light focusing ring.

(5-2-2) Application of External Magnetic Field and Irradiation Test of Light in Millimeter Wave Band Next, as described above, the application of the external magnetic field and an irradiation test of the light in the millimeter wave band were performed by using the millimeter wave light focusing ring 12 directly formed on the surface of the magnetic film 18. First, as illustrated in FIG. 13, the magnetization of the magnetic film 18 was oriented to the top from the bottom. Then, the external magnetic field $H_0$ was applied to the bottom from the top which is a direction opposite to the initial magnetization direction of the magnetic film 18, by using a permanent magnet. The external magnetic field $H_0$ was 2.9 [kOe]. In addition, one shot of the pulsed light L1 in the millimeter wave band, illustrated in FIG. 5, was applied toward the millimeter wave light focusing ring 12 to the bottom from the top, as with the external magnetic field $H_0$.

Figure 14A:
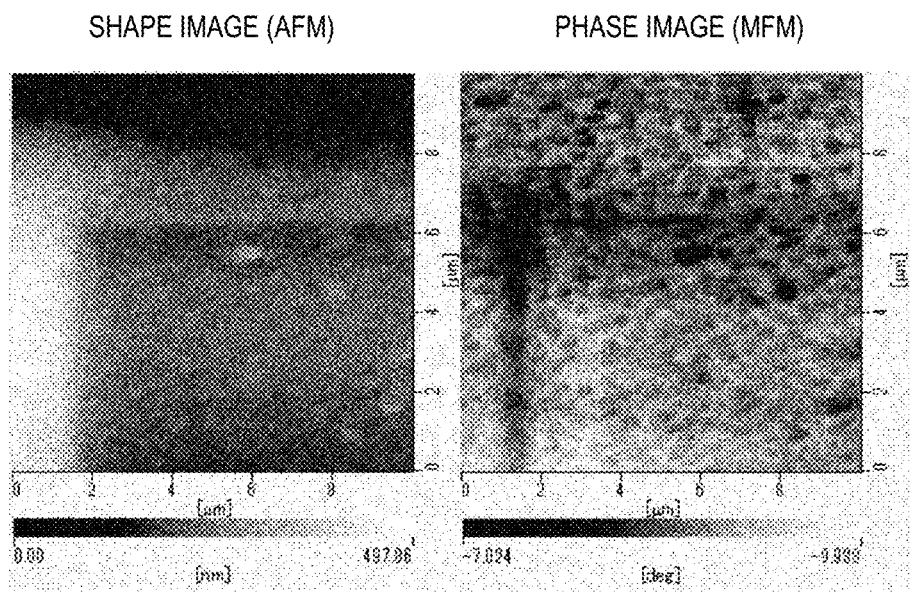
FIG. 14A is a diagram in which an image of an analysis result of AFM and an image of an analysis result of MFM are arranged.

As illustrated in FIG. 12B, in a region $ER_2$ in the corner portion of the millimeter wave light focusing ring 12, analysis using an atomic force microscope (AFM), analysis using a magnetic force microscope (MFM), and electromagnetic field analysis were performed. FIG. 14A is a diagram in which an analysis result of AFM and an analysis result of MFM using a magnetic probe are arranged.

The analysis result of AFM and the analysis result of MFM using the magnetic probe are a measurement result obtained by being simultaneously measured, and from the analysis result of AFM, it was possible to check the corner portion of the millimeter wave light focusing ring 12. In addition, from the analysis result of MFM using the magnetic probe, it was possible to check that the color was changed along the corner portion of the millimeter wave light focusing ring 12 that is checked from the analysis result of AFM. From the analysis result of MFM using the magnetic probe, it was possible to check that the magnetization of the magnetic film 18 was inverted at the periphery of the millimeter wave light focusing ring 12.

Figure 14B:
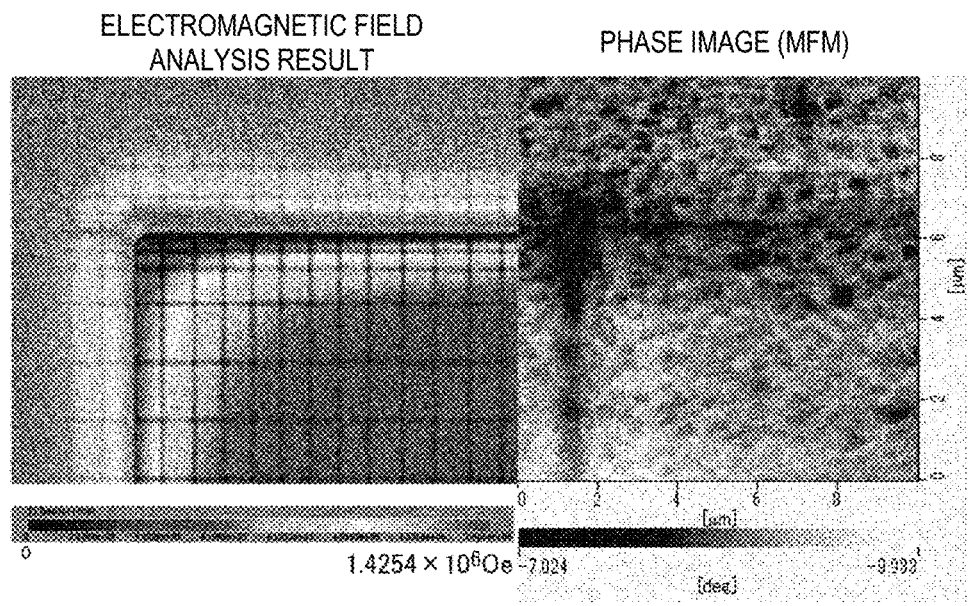
FIG. 14B is a diagram in which an image of an electromagnetic field analysis result and an image of an analysis result of MFM are arranged.

FIG. 14B is a diagram in which an electromagnetic field analysis result and an analysis result of MFM using a magnetic probe are arranged. The electromagnetic field analysis result is obtained by analyzing a magnetic field intensity on a flat surface 94 [nm] below the lower surface of the millimeter wave light focusing ring 12. From the electromagnetic field analysis result, it was possible to check that the magnetic field intensity increased along the corner portion of the millimeter wave light focusing ring 12.

Figure 15A:
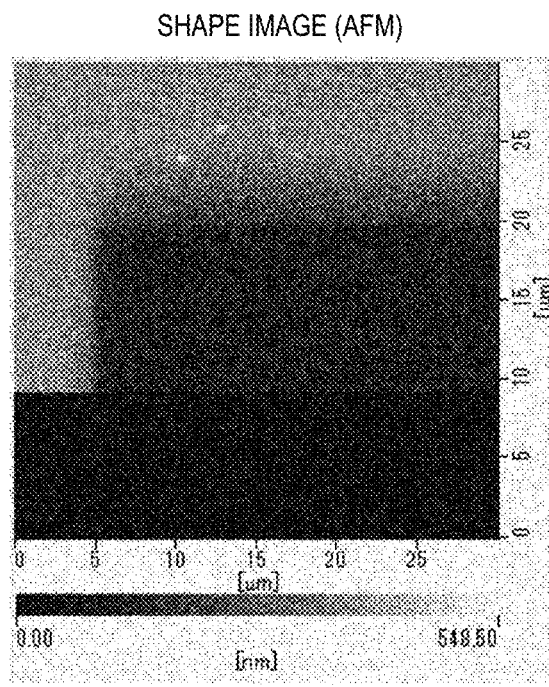
FIG. 15A is an image of an analysis result of AFM using a non-magnetic probe.
Figure 15B:
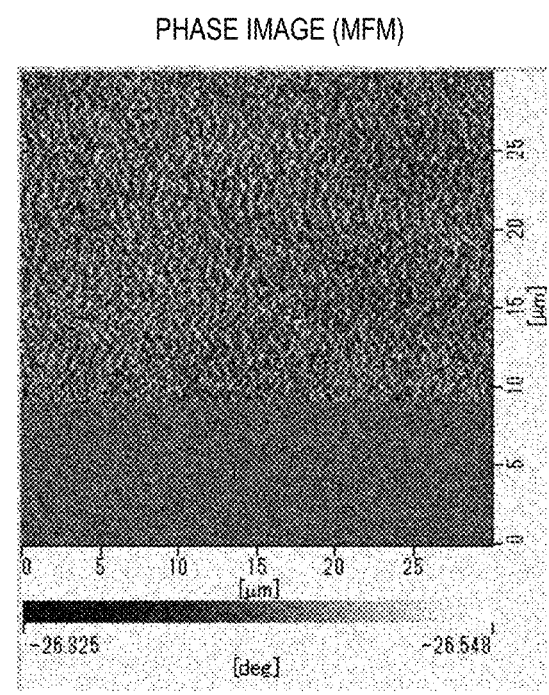
FIG. 15B is an image of an analysis result of MFM using a non-magnetic probe.

Next, in the region $ER_2$ in the corner portion of the millimeter wave light focusing ring 12 illustrated in FIG. 12B, AFM analysis and MFM analysis were performed by using a non-magnetic probe, and as a result thereof, a result as illustrated in FIG. 15A and FIG. 15B is obtained. From the analysis result of AFM of FIG. 15A, it was possible to check the corner portion of the millimeter wave light focusing ring 12, but from the analysis result of MFM using the non-magnetic probe, illustrated in FIG. 15B, it was not possible to check a change in the color in the corner portion of the millimeter wave light focusing ring 12. As described above, it was not possible to check a response in the MFM analysis using the non-magnetic probe, and thus, it can be said that the MFM analysis illustrated in FIG. 14A and FIG. 14B is a magnetic response.

Figure 16:
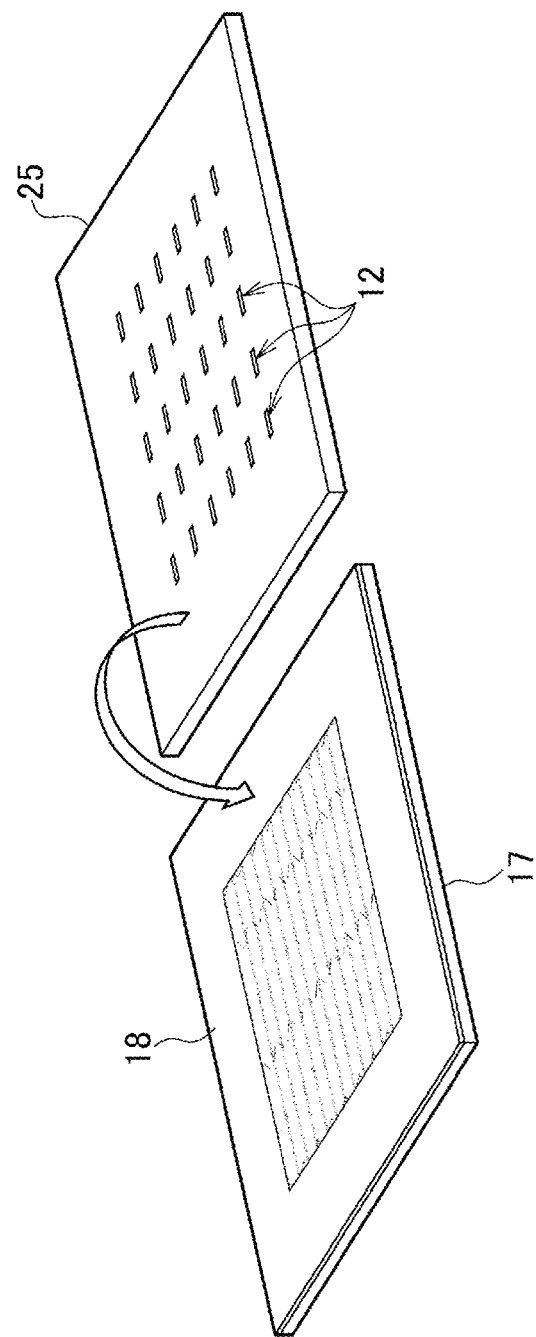
FIG. 16 is a schematic view illustrating a state in which a silicon substrate on which a millimeter wave light focusing ring is provided is stacked on a magnetic film.

(5-3) Validation Test Using Sample in which Light Focusing Ring on Silicon Substrate is Stacked on Magnetic Film (5-3-1) Preparation of Sample in which Light Focusing Ring on Silicon Substrate is Stacked on Magnetic Film In this validation test, as with "(5-2-1) Preparation of Magnetic Film onto Which Millimeter Wave Light Focusing Ring Is Attached" described above, the dispersion liquid containing the epsilon iron oxide particles containing the $\varepsilon\text{-Ga}_{0.22}\text{Ti}_{0.05}\text{Co}_{0.07}\text{Fe}_{1.68}\text{O}_3$ crystals was coated on the quartz substrate and was placed at the magnetic flux density of 2 T, and the dispersion liquid was dried, and thus, as illustrated in FIG. 16, the transparent magnetic film 18 was formed on the quartz substrate 17. At this time, the magnetic film 18 was disposed such that the magnetic flux density was applied in the perpendicular direction.

Figure 17A:
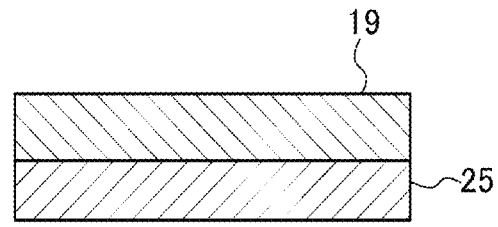
FIG. 17A is a schematic view illustrating a configuration of a silicon substrate on which a resist is formed.
Figure 17B:
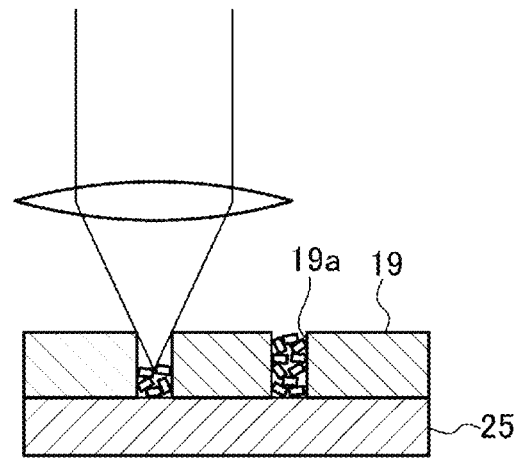
FIG. 17B is a schematic view for describing resist processing.
Figure 17C:
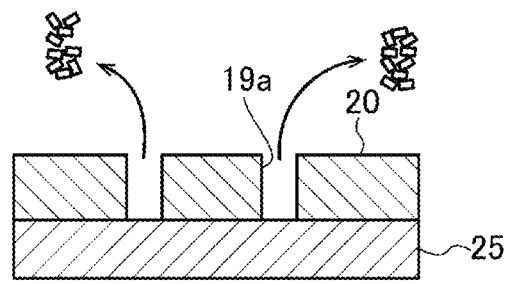
FIG. 17C is a schematic view illustrating a patterned resist.

Separately, the light focusing ring 12 containing Au that is designed to resonate light at 27 [GHz] or 80 [GHz] (here, simply referred to as the light focusing ring without being referred to as the millimeter wave light focusing ring since the resonance is also performed at 27 [GHz]) was formed along the surface of the silicon substrate 25. Note that, a method of preparing the light focusing ring 12 on the silicon substrate is illustrated in FIG. 17A to FIG. 17F. First, as illustrated in FIG. 17A, a resist 19 was formed on the silicon substrate 25. Next, as illustrated in FIG. 17B, the resist 19 was patterned by an electron beam, the hole 19a coincident with the outer shape of the light focusing ring designed to resonate light at 27 [GHz] or 80 [GHz] was formed, and as illustrated in FIG. 17C, a resist 20 in which the silicon substrate 25 is exposed inside the hole 19a was prepared.

Figure 17D:
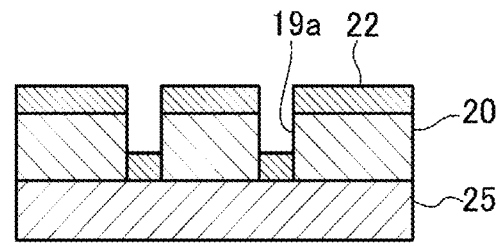
FIG. 17D is a schematic view after forming a plating layer.
Figure 17E:
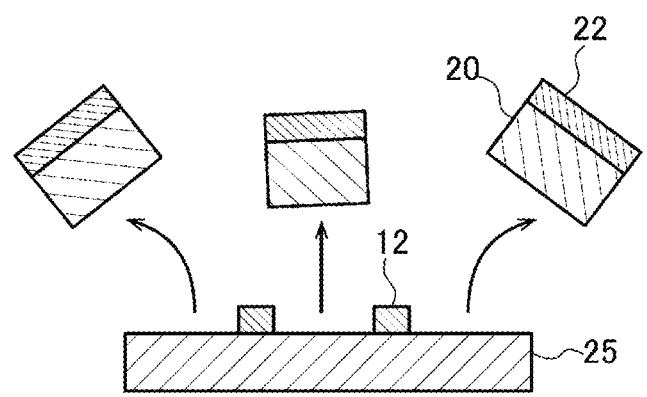
FIG. 17E is a schematic view after removing a patterned resist.
Figure 17F:
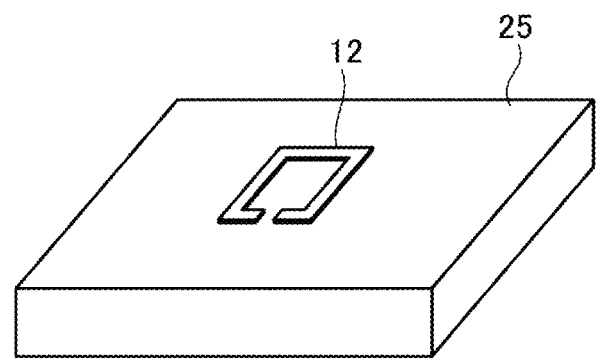
FIG. 17F is a schematic view illustrating a configuration in which a millimeter wave light focusing ring is formed on a silicon substrate.

Next, as illustrated in FIG. 17D, in order to fill the hole 19a of patterned resist 20, a plating layer 22 containing gold (Au) was formed by vapor deposition, and then, as illustrated in FIG. 17E, the resist 20 was removed, and thus, the plating layer 22 remained only in the position of the hole 19a. Accordingly, as illustrated in FIG. 17F, the light focusing ring 12 containing Au that resonates light at 27 [GHz] or 80 [GHz] was formed on the silicon substrate 25. The light focusing ring 12 was formed such that the entire side length was attached onto the surface of the silicon substrate 25. Then, the silicon substrate 25 prepared as described above was stacked on the magnetic film 18, and thus, a sample was prepared in which the light focusing ring 12 was disposed between the magnetic film 18 and the silicon substrate 25.

Figure 18:
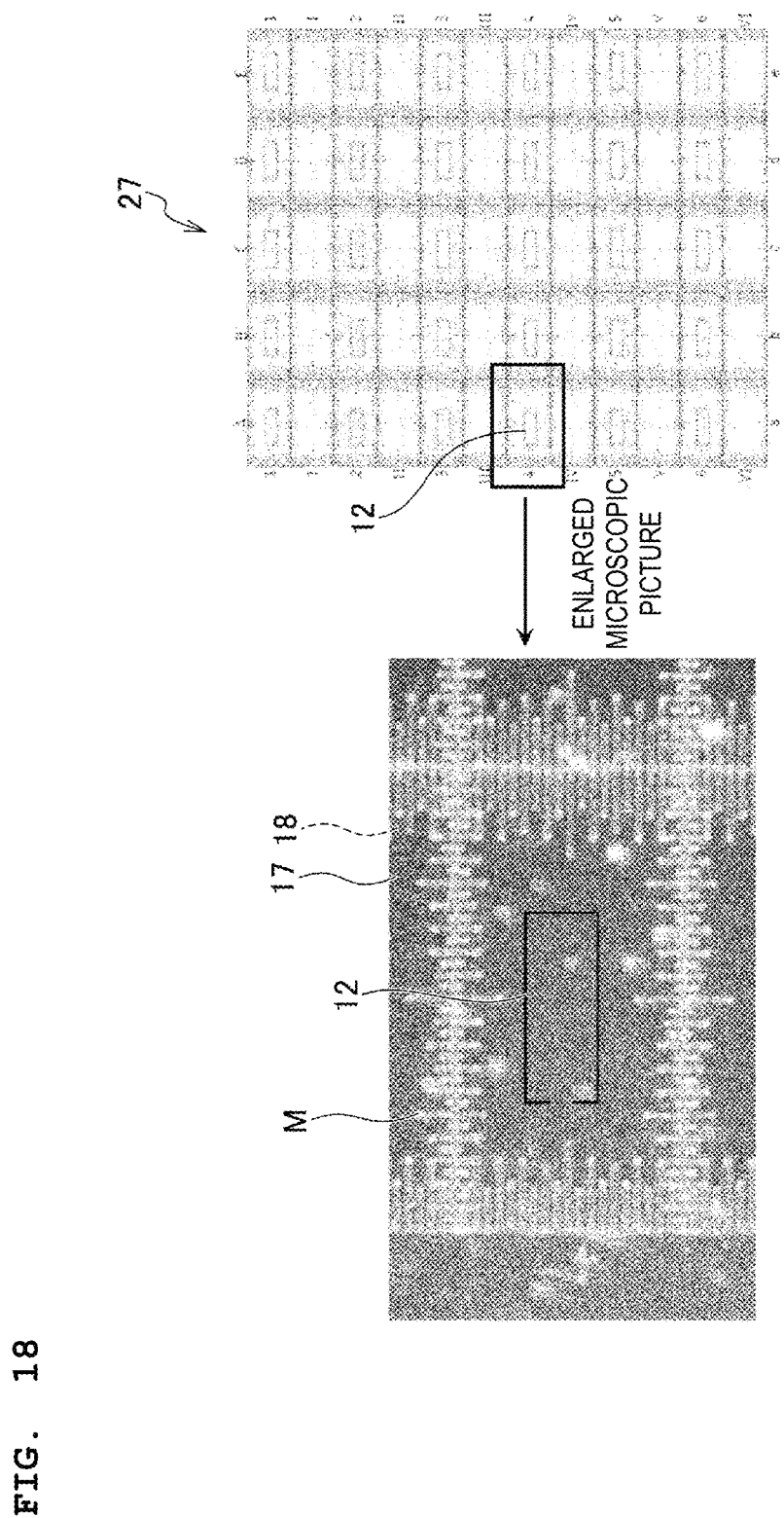
FIG. 18 is a schematic view illustrating a configuration of a sample in which a silicon substrate is stacked on a magnetic film.

FIG. 18 illustrates the configuration of the upper surface of a sample 27 in which the light focusing ring 12 is provided between the magnetic film 18 and the silicon substrate 25, and a picture obtained by a magnifying microscope photographing a region of the sample 27 in which one light focusing ring 12 is provided. Note that, in this validation test, a plurality of light focusing rings 12 were disposed into the shape of a matrix. In addition, a marking M was formed on the surface of the magnetic film 18 by a laser such that the marking M was disposed at the periphery of the light focusing ring 12 when the magnetic film 18 was stacked on the silicon substrate 25. Note that, the marking M functions as a guide for specifying the position of each portion of each of the light focusing rings 12.

Figure 20A:
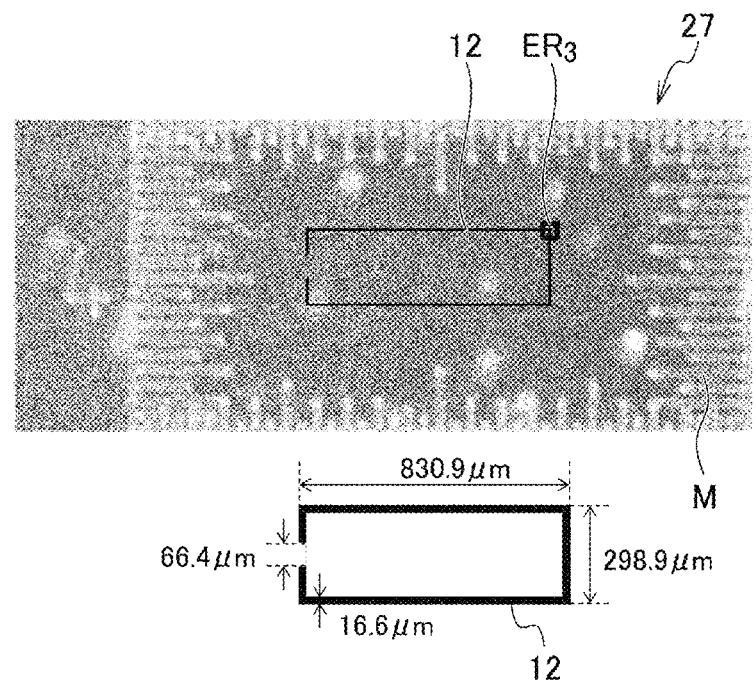
FIG. 20A is a schematic view illustrating an enlarged picture of the sample of FIG. 19 and a configuration of a millimeter wave light focusing ring that is provided within the enlarged picture.

As illustrated in FIG. 20A, the light focusing ring 12 designed to resonate light at 80 [GHz] was disposed within an observation region enlarged by the magnifying microscope. In this case, the light focusing ring 12 is formed such that the short side is 298.9 [μm], the gap is 66.4 [μm], the long side is 830.9 [μm], and the line width is 16.6 [μm].

Figure 19:
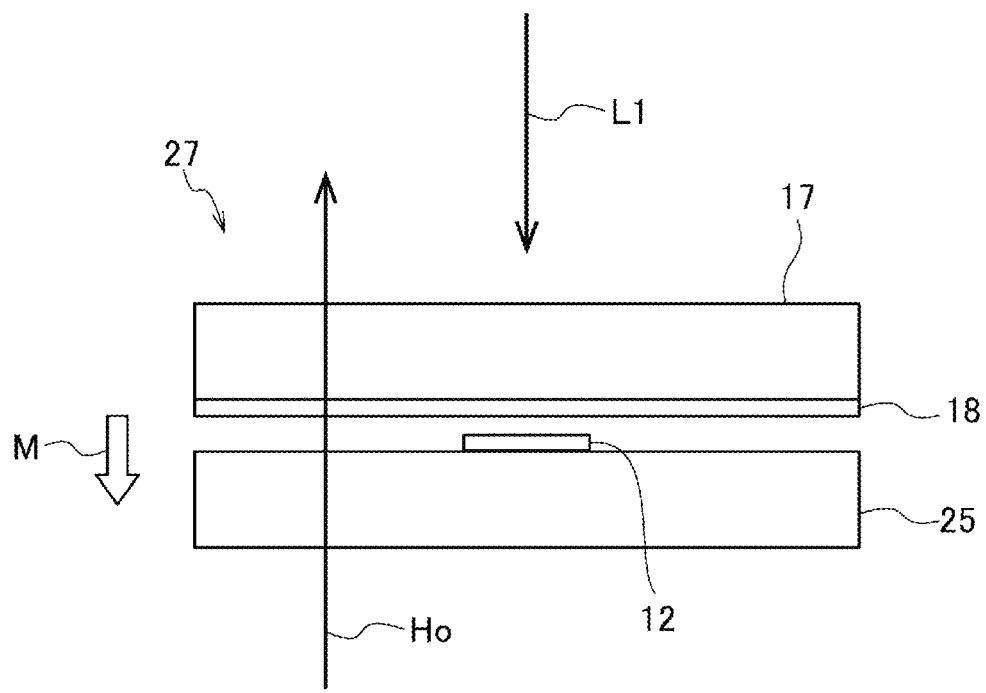
FIG. 19 is a schematic view for describing an application direction of an external magnetic field that is applied to a magnetic film and an irradiation direction of light of 79 [GHz] that is applied to a millimeter wave light focusing ring.

(5-3-2) Application of External Magnetic Field and Irradiation Test of Light in Millimeter Wave Band or Quasi-Millimeter Wave Band First, as illustrated in FIG. 19, the magnetization of the magnetic film 18 was oriented to the bottom from the top. Then, the external magnetic field $H_0$ was applied to the top from the bottom which is the direction opposite to the initial magnetization direction of the magnetic film 18, by using a permanent magnet. The external magnetic field $H_0$ was 3.8 [kOe]. In addition, the light L2 illustrated in FIG. 5 was applied toward the light focusing ring 12 for 30 [sec] to the bottom from the top, which is opposite to that of the external magnetic field $H_0$.

When the magnetic film 18 is stacked on the silicon substrate 25, it is considered that a gap of several hundreds [nm] is formed between the magnetic film 18 and the light focusing ring 12 by a convex portion or the like existing on the surface of the magnetic film 18 or the silicon substrate 25.

Figure 20B:
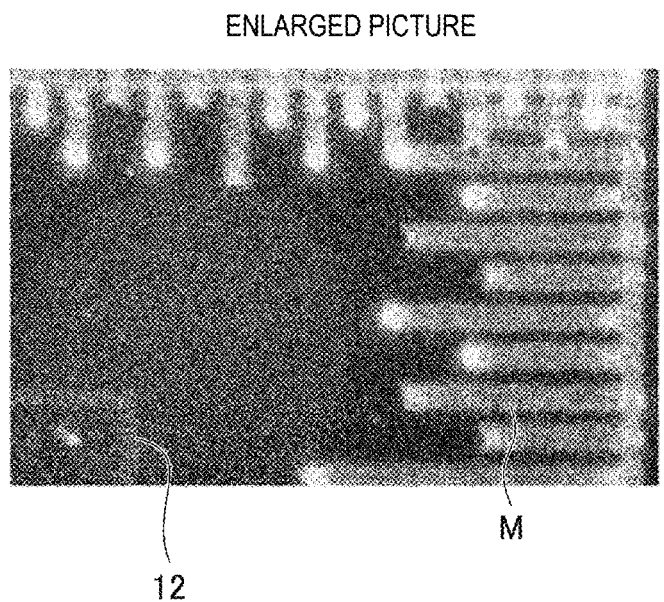
FIG. 20B is an enlarged picture further enlargedly showing an analysis region in the enlarged picture of FIG. 20A.

FIG. 20B illustrates a picture in which a region $ER_3$ in the corner portion of the light focusing ring 12 illustrated in FIG. 20A is mainly enlarged, and in FIG. 20B, the corner portion of the light focusing ring 12 is photographed, and thus, it is found that the light focusing ring 12 is provided. Then, the silicon substrate 25 was peeled off from the magnetic film 18, and then, as illustrated in FIG. 21, regions $ER_4$ and $ER_5$ of the magnetic film 18 in the vicinity of the inner circumferential corner portion of the light focusing ring 12 were subjected to MFM analysis and electromagnetic field analysis, and as a result thereof, a result as illustrated in FIG. 21 was obtained.

In FIG. 21, an analysis result of MFM (an MFM image) and an electromagnetic field analysis result in the regions $ER_4$ and $ER_5$ of the magnetic film 18 in the vicinity of the corner portion of the light focusing ring 12 are arranged, respectively.

From the analysis result of MFM illustrated in FIG. 21, it was possible to check that the color in the corner portion of the light focusing ring 12 was changed. From such an analysis result of MFM, it was possible to check that the magnetization of the magnetic film 18 was inverted even in a case where the gap was formed between the magnetic film 18 and the light focusing ring 12. In addition, from the electromagnetic field analysis result illustrated in FIG. 21, it was possible to check that in the magnetic film 18, a strong magnetic field was formed in the vicinity of the corner portion of the light focusing ring 12, compared to the others.

Separately, as with the procedure described above, the external magnetic field $H_0$ was applied to the magnetic film 18 prepared in "(5-3-1) Preparation of Sample in Which Light Focusing Ring on Silicon Substrate Is Stacked on Magnetic Film" to the top from the bottom which is the direction opposite to the initial magnetization direction of the magnetic film 18. Then, light in a quasi-millimeter wave band of 27 [GHz] was applied toward the light focusing ring 12 to the bottom from the top which is opposite to that of the external magnetic field $H_0$.

The silicon substrate 25 was peeled off from the magnetic film 18, and then, a region of the magnetic film 18 in the vicinity of the light focusing ring 12 was subjected to MFM analysis and electromagnetic field analysis. As a result thereof, it was possible to check that the color was changed in the region of the magnetic film 18 in the vicinity of the light focusing ring 12. From such an analysis result of MFM, it was possible to check that the magnetization of the magnetic film 18 was inverted even in a case where light was applied to a ring performing resonance within a quasi-millimeter wave band of 27 [GHz] that is less than 30 [GHz].

From the validation result described above, in the light focusing ring 12 used as the millimeter wave light focusing ring 12, it was possible to check that light was capable of being resonated by the light focusing ring 12 and an enhanced magnetic field was obtained even in a case where the light was applied to the ring performing the resonance within the quasi-millimeter wave band of 27 [GHz] that is less than 30 [GHz]. For this reason, in the recording device 10 of this embodiment, not only the light within the millimeter wave band of 30 to 300 [GHz] but also light within a quasi-millimeter wave band of 20 to 30 [GHz] can be used. Note that, here, in a case where the frequency of light is less than 20 [GHz], it is assumed that the ring size is greater than 1 [mm], and the recording width increases, and thus, it is desirable that the frequency of the light L1 is 20 [GHz] or more.

(6) Operation and Effect

In the configuration described above, in the recording device 10, the frequency band of the light L1 is not limited, and for example, the light focusing ring 12 is irradiated with the light L1 within a band of 20 to 1000 [GHz], preferably, 30 to 300 [GHz], and thus, the light L1 can be resonated and focused by the light focusing ring 12, and an enhanced magnetic field in which the magnetic field of the light L1 is enhanced can be generated. Accordingly, in the recording device 10, the external magnetic field $H_0$ from the external magnetic field application unit 11 and the enhanced magnetic field $H_M$ generated from the light focusing ring 12 are applied to the magnetic recording medium 1, and thus, the magnetization of the magnetic recording medium 1 can be inverted.

As described above, in the recording device 10, the enhanced magnetic field is obtained by resonating the light L1 with the light focusing ring 12, and the enhanced magnetic field is used together to invert the magnetization of the magnetic recording medium 1, and thus, the external magnetic field $H_0$ that is required to invert the magnetization can be decreased. Accordingly, even on the magnetic recording medium 1 having a high coercive force, it is possible to easily record information in a low external magnetic field $H_0$ by resonating the light.

However, recently, a microwave assist recording method has been known in which a microwave magnetic field is applied to a magnetic recording medium from a spin-torque oscillator (STO) generating a microwave, together with an external magnetic field, by using STO when information is recorded, and a magnetization pattern is formed by assisting magnetization inversion of a strong magnetic powder. In contrast, the recording device 10 of this embodiment resonates and focuses the light L1 from the light irradiation unit 13 with the light focusing ring 12, and applies the enhanced magnetic field in which the magnetic field of the light is enhanced by the light focusing ring 12 to the magnetic recording medium 1, together with the external magnetic field, and thus, has a configuration completely different from that of a recording device of the microwave assist recording method described above.

In the recording device 10 of this embodiment, it is possible to generate a strong magnetic field in the quasi-millimeter wave band, the millimeter wave band, and the subterahertz wave band in a narrow region and to perform magnetization inversion of a material having high magnetic anisotropy in which the magnetic properties are not lost even in microparticulation, and thus, an advantageous effect of improving a recording density is obtained, compared to the microwave assist recording method.

In the recording device 10, the light L1 from the light irradiation unit 13 is applied toward the light focusing ring 12 without being applied toward a region of the magnetic recording medium 1 facing the side of the light focusing ring 12. Accordingly, in the recording device 10, it is sufficient that the light is applied to the light focusing ring 12 having a comparatively wide irradiation range, and thus, the recording device 10 having a high freedom degree of design such as an irradiation angle or an installation position of the light irradiation unit 13 can be attained.

(7) Other Embodiments

Figure 22:
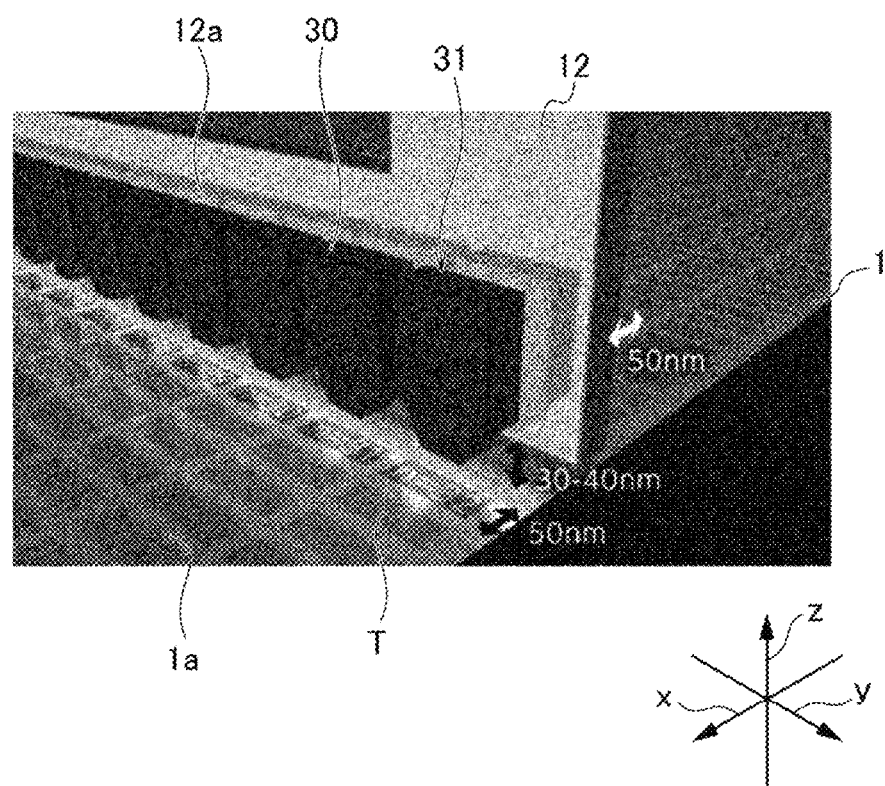
FIG. 22 is a schematic view illustrating a configuration in which a plurality of external magnetic field units are disposed in line.

The invention is not limited to this embodiment, and various modifications can be carried out within a range of the gist of the invention. In the embodiment described above, one light focusing ring 12 is provided in one external magnetic field application unit 11, but the invention is not limited thereto. For example, as illustrated in FIG. 22, an external magnetic field application unit 31 including a plurality of external magnetic field units 30 may be provided in the light focusing ring 12.

Such a recording device, for example, includes the external magnetic field application unit 31 in which the plurality of external magnetic field units 30 are disposed in line along the side 12a of the light focusing ring 12 disposed to face the magnetic recording medium 1. Each of the external magnetic field units 30 is disposed on the side 12a of the light focusing ring 12 in accordance with each track T arranged in the width direction of the magnetic recording medium 1. Accordingly, each of the external magnetic field units 30 is capable of applying external magnetic field $H_0$ only to the track T located immediately below the external magnetic field unit.

According to such a configuration, when the magnetization of the magnetic recording medium 1 is inverted by applying the external magnetic field $H_0$ from the external magnetic field application unit 11 and the enhanced magnetic field $H_M$ generated from the light focusing ring 12 to the magnetic recording medium 1, the external magnetic field $H_0$ is applied only from the external magnetic field unit 30 in a necessary location, and thus, the magnetization of the magnetic recording medium 1 is inverted for each external magnetic field unit 30.

Figure 23A:
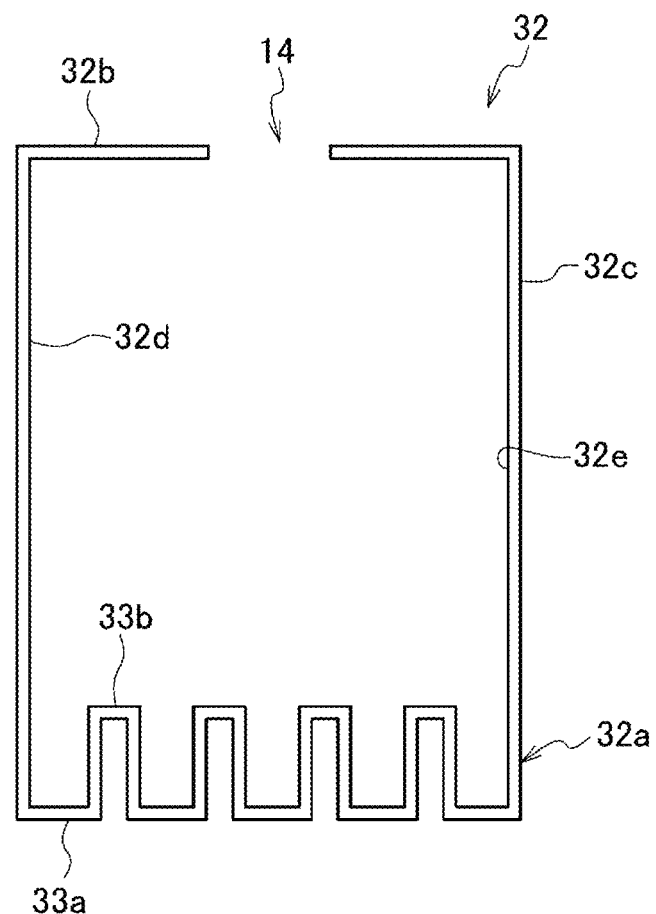
FIG. 23A is a schematic view illustrating a configuration of a millimeter wave light focusing ring according to another embodiment.

In the embodiment described above, a case has been described in which the quadrilateral light focusing ring 12 including the gap 14 on one side is applied as the light focusing unit, but the invention is not limited thereto, and as illustrated in FIG. 23A, a light focusing ring 32 including a tortuous concavo-convex side 32a may be applied.

The light focusing ring 32 illustrated in FIG. 23A includes the concavo-convex side 32a formed into the shape of a rectangular wave by a convex portion 33a and a concave portion 33b, a side 32b that faces the concavo-convex side 32a and includes the gap 14, and lateral sides 32c and 32d that connect the end portions of the concavo-convex side 32a and the side 32b.

In such a light focusing ring 32, the convex portion 33a of the concavo-convex side 32a is disposed in accordance with each of the tracks arranged in the width direction of the magnetic recording medium 1, and thus, the enhanced magnetic field $H_M$ emitted from each of the convex portions 33a can be applied to each of the tracks located immediately below the convex portion. In particular, from the validation test described above, it is checked that a comparatively strong enhanced magnetic field $H_M$ is generated in the corner portion of the light focusing ring, and thus, according to such a configuration, a strong enhanced magnetic field $H_M$ emitted from the corner portion of each of the convex portions 33a can be applied to the track.

The light focusing ring 32 described above includes the concavo-convex side 32a that is tortuous in the shape of a rectangular wave, but for example, may include a concavo-convex side that is tortuous in the shape of a sine wave, a concavo-convex side that is tortuous in the shape of a triangular wave, a concavo-convex side that is tortuous in the shape of a sawtooth wave, or the like.

Figure 23B:
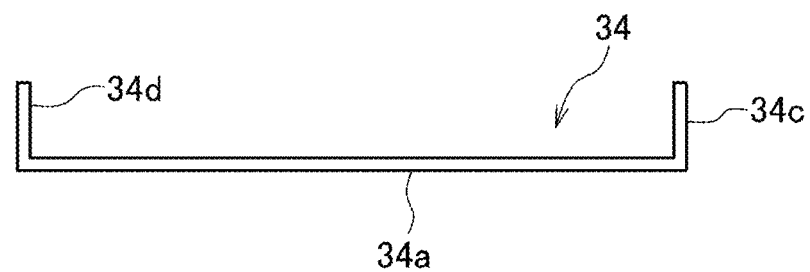
FIG. 23B is a schematic view illustrating a configuration of a non-ring-shaped millimeter wave light focusing unit.

As illustrated in FIG. 23B, a non-ring-shaped light focusing unit 34 including three sides of a side 34a and lateral sides 34c and 34d provided in the end portion of the side 34a may be applied as the other light focusing unit. Further, an L-shaped or U-shaped light focusing unit, a circular light focusing unit including a gap, or the like may be applied as the other light focusing unit. Even in such light focusing units having the shapes described above, for example, light can be focused by resonating light within a band of 20 to 1000 [GHz], preferably, 30 to 300 [GHz], and an enhanced magnetic field in which a magnetic field of the light is enhanced can be generated, by selecting the side length.

The light focusing ring 32 illustrated in FIG. 23A, the light focusing unit 34 illustrated in FIG. 23B, or the like may be applied instead of the light focusing ring 12 illustrated in FIG. 22, described above. For example, in a case where the light focusing ring 12 illustrated in FIG. 22 is changed to the light focusing ring 32 illustrated in FIG. 23A, the external magnetic field unit 30 may be provided in the convex portion 33a of the light focusing ring 32.

For example, various magnetic recording media such as a magnetic tape or a magnetic disk may be applied as the magnetic recording medium in the embodiment described above.

In the embodiment described above, a case has been described in which the epsilon iron oxide particles are applied as the magnetic recording material having a high coercive force $H_c$, but the invention is not limited thereto, and for example, a magnetic recording medium may be applied in which hexagonal ferrite such as Sr ferrite and Ba ferrite and metal substitutes thereof (also including a plurality of metal substitutions), spinel ferrite such as Co ferrite, magnetite, manganese zinc ferrite, nickel zinc ferrite, and copper zinc ferrite and metal substitutes thereof (also including a plurality of metal substitutions), garnet ferrite such as yttrium iron garnet and a metal substitute thereof (also including a plurality of metal substitutions), a magnetic alloy such as FePt, CoPt, and FePd and metal substitutes thereof (also including a plurality of metal substitutions), and the like are used as the magnetic recording material.

In the embodiment described above, a case where the light focusing unit is irradiated with the light after the external magnetic field is applied and a case where the external magnetic field is applied after the light focusing unit is irradiated with the light have been described as the order of the application of the external magnetic field and the irradiation of the light to the magnetic recording medium, but the invention is not limited thereto, and the application of the external magnetic field and the irradiation of the light may be simultaneously performed.

In the embodiment described above, a case has been mainly described in which the light L1 within the millimeter wave band of 30 to 300 [GHz] is applied, the light L1 is resonated and focused by the millimeter wave light focusing ring 12, and the millimeter wave magnetic field in which the magnetic field of the light is enhanced by the millimeter wave light focusing ring 12 is applied to the magnetic recording medium 1 together with the external magnetic field, but the invention is not limited thereto, and the frequency band of the light L1 is not particularly limited. In this embodiment, as described above, insofar as the size of the light focusing ring 12 is selected such that the magnetic field can be enhanced at the resonate frequency of the light L1, the light L1 can be resonated and focused by the light focusing ring 12, and the enhanced magnetic field in which the magnetic field of the light is enhanced by the light focusing ring 12 can be applied to the magnetic recording medium 1 together with the external magnetic field.

That is, the light within the quasi-millimeter wave band of 20 to 30 [GHz] can also be resonated and focused by the light focusing ring 12, and the enhanced magnetic field (the quasi-millimeter wave magnetic field) in which the magnetic field of the light is enhanced by the light focusing ring 12 can be applied to the magnetic recording medium 1 together with the external magnetic field. In addition, the light within the subterahertz wave band of 300 to 1000 [GHz] can also be resonated and focused by the light focusing ring 12, and the enhanced magnetic field (the subterahertz wave magnetic field) in which the magnetic field of the light is enhanced by the light focusing ring 12 can be applied to the magnetic recording medium 1 together with the external magnetic field. Accordingly, even in the case of using the light in the frequency band described above, it is possible to obtain the same effect as that of the embodiment described above.

REFERENCE SIGN LIST

1: Magnetic recording medium
10: Recording device
11, 31: External magnetic field application unit
12, 32: Millimeter wave light focusing ring, light focusing ring (light focusing unit)
13: Light irradiation unit
34: Light focusing unit

The invention claimed is:
1. A recording device, comprising:
an external magnetic field application unit that is configured to apply an external magnetic field to a magnetic recording medium;
a light irradiation unit that is configured to irradiate light within a frequency band of 20 GHz to 1000 GHz; and
a light focusing unit that is configured to focus the light from the light irradiation unit by resonating the light to generate an enhanced magnetic field in which a magnetic field of the light is enhanced, wherein magnetization of the magnetic recording medium is inverted by applying the external magnetic field and the enhanced magnetic field to the magnetic recording medium.

2. The recording device according to claim 1, wherein the light focusing unit resonates the light at a resonance frequency at which natural resonance occurs in the magnetic recording medium, and generates the enhanced magnetic field in which the magnetic field is enhanced at the resonance frequency.

3. The recording device according to claim 1, wherein the light focusing unit includes a side on which the enhanced magnetic field is generated, and the side is configured to be disposed within 200 nm from a recording surface of the magnetic recording medium.

4. The recording device according to claim 1, wherein the light focusing unit includes a side on which the enhanced magnetic field is generated, the side includes a corner portion, and the corner portion is configured to be disposed to face the magnetic recording medium.

5. The recording device according to claim 1, wherein the external magnetic field application unit includes a plurality of external magnetic field units configured to be disposed in line along a recording surface of the magnetic recording medium, and the magnetization of the magnetic recording medium is inverted by each of the plurality of external magnetic field units.

6. The recording device according to claim 1, wherein the magnetic recording medium contains epsilon iron oxide particles on the recording surface.

7. The recording device according to claim 1, wherein the light irradiation unit applies the light toward the light focusing unit without applying the light toward a region of the magnetic recording medium facing the light focusing unit.

8. The recording device according to claim 1, wherein the light focusing unit is a ring-shaped light focusing ring including a gap.

9. The recording device according to claim 1, wherein the light irradiation unit applies pulsed light as the light.

10. A recording method, comprising:
focusing light by resonating light within a frequency band of 20 GHz to 1000 GHz with a light focusing unit;
generating an enhanced magnetic field in which a magnetic field of the light is enhanced;
applying an external magnetic field from an external magnetic field application unit and the enhanced magnetic field to a magnetic recording medium; and
inverting magnetization of the magnetic recording medium.

11. The recording method according to claim 10, wherein the light focusing unit is irradiated with the light after the external magnetic field is applied to the magnetic recording medium.

12. The recording method according to claim 10, wherein the external magnetic field is applied to the magnetic recording medium after the light focusing unit is irradiated with the light.

13. The recording method according to claim 10, wherein the magnetic recording medium contains epsilon iron oxide particles on a recording surface.

14. A recording device, comprising:
an external magnetic field application unit that is configured to apply an external magnetic field to a magnetic recording medium;
a light irradiation unit that is configured to irradiate light; and
a light focusing unit that is configured to focus light from the light irradiation unit by resonating the light to generate an enhanced magnetic field in which a magnetic field of the light is enhanced,
wherein magnetization of the magnetic recording medium is inverted by applying the external magnetic field and the enhanced magnetic field to the magnetic recording medium, and
the light focusing unit includes a side on which the enhanced magnetic field is generated, and the side is configured to be disposed within 200 nm from a recording surface of the magnetic recording medium.

15. The recording device according to claim 14, wherein the light focusing unit resonates the light at a resonance frequency at which natural resonance occurs in the magnetic recording medium, and generates the enhanced magnetic field in which the magnetic field is enhanced at the resonance frequency.

16. The recording device according to claim 14, wherein the light focusing unit includes a side on which the enhanced magnetic field is generated, the side includes a corner portion, and the corner portion is configured to be disposed to face the magnetic recording medium.

17. The recording device according to claim 14, wherein the external magnetic field application unit includes a plurality of external magnetic field units configured to be disposed in line along a recording surface of the magnetic recording medium, and the magnetization of the magnetic recording medium is inverted by each of the plurality of external magnetic field units.

18. A recording method, comprising:
focusing light by resonating light with a light focusing unit;
generating an enhanced magnetic field in which a magnetic field of the light is enhanced;
applying an external magnetic field from an external magnetic field application unit and the enhanced magnetic field to a magnetic recording medium; and
inverting magnetization of the magnetic recording medium, wherein
the magnetic recording medium contains epsilon iron oxide particles on a recording surface.

19. The recording method according to claim 18, wherein the light focusing unit is irradiated with the light after the external magnetic field is applied to the magnetic recording medium.

20. The recording method according to claim 18, wherein the external magnetic field is applied to the magnetic recording medium after the light focusing unit is irradiated with the light.

* * * * *